United States Patent [19]

Suyama et al.

[11] Patent Number: 4,879,664
[45] Date of Patent: Nov. 7, 1989

[54] THREE-DIMENSIONAL POSITION SENSOR AND THREE-DIMENSIONAL POSITION SETTING SYSTEM

[75] Inventors: Toshimitsu Suyama, Ohmorinishi; Yasutomo Fujimori, Yokohama, both of Japan

[73] Assignee: Kabushiki Kaisha Toshiba, Kawasaki, Japan

[21] Appl. No.: 23,553

[22] PCT Filed: Jan. 28, 1986

[86] PCT No.: PCT/JP86/00033

§ 371 Date: Jan. 23, 1987

§ 102(e) Date: Jan. 23, 1987

[30] Foreign Application Priority Data

May 23, 1985 [JP] Japan ................................ 60-110909
Aug. 9, 1985 [JP] Japan ................................ 60-175517
Oct. 22, 1985 [JP] Japan ................................ 60-235678

[51] Int. Cl.⁴ ...................... G01B 11/00; G01C 15/00
[52] U.S. Cl. .................................. 364/518; 364/513; 364/522; 364/474.28; 901/47
[58] Field of Search .......................... 364/518-523, 364/488-491, 167.01, 444, 449, 453-456, 460, 474.34, 474.35, 478, 513; 901/46, 47

[56] References Cited

FOREIGN PATENT DOCUMENTS

| | | |
|---|---|---|
| 40-23314 | 10/1965 | Japan . |
| 48-31552 | 9/1973 | Japan . |
| 52-55658 | 5/1977 | Japan . |
| 54-76179 | 6/1979 | Japan . |
| 54-121164 | 9/1979 | Japan . |
| 56-18707 | 2/1981 | Japan . |
| 57-156504 | 9/1982 | Japan . |
| 59-72012 | 4/1984 | Japan . |
| 59-104007 | 7/1984 | Japan . |

OTHER PUBLICATIONS

An Optical Proximity Sensor For Measuring Surface Position And Orientation, Robotics Institute, Carnegie-Mellon University, Sep. 5, 1983.

Primary Examiner—Gary V. Harkcom
Assistant Examiner—H. R. Herndon
Attorney, Agent, or Firm—Oblon, Spivak, McClelland, Maier & Neustadt

[57] ABSTRACT

A three-dimensional position sensor can measure a position and inclination angles of a head (1) with respect to an object (9) in a noncontact manner in the three-dimensional tooling or assembly of the object (9) as a workpiece by utilizing a work robot or the like. The three-dimensional position sensor includes a plurality of projectors (31 to 34), arranged on a teaching head (3), for obliquely projecting beams onto an object (9) and forming on the object (9) a plurality of bright spots (S1 to S4) constituting vertices of a triangle image pickup device (35) for picking up an image including the bright spots (S1 to S4), position setting point (P) indicated on the object (9), and the surface of the object (9) and image processor (8a) for electrically reading the bright spots (S1 to S4) and position setting point (P), both of which are picked up by the image pickup device (35), and for detecting the three-dimensional position and the posture of the head (1) with respect to the position setting point (P). In a three-dimensional position setting system using the above three-dimensional position sensor, a laser work head (2) is located in a predetermined three-dimensional position and a predetermined posture of the head with respect to the object on the basis of information detected by the three-dimensional position sensor in a noncontact manner.

18 Claims, 24 Drawing Sheets

F I G. 3
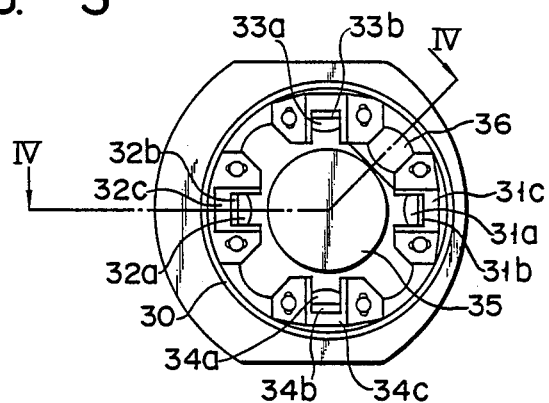
F I G. 4
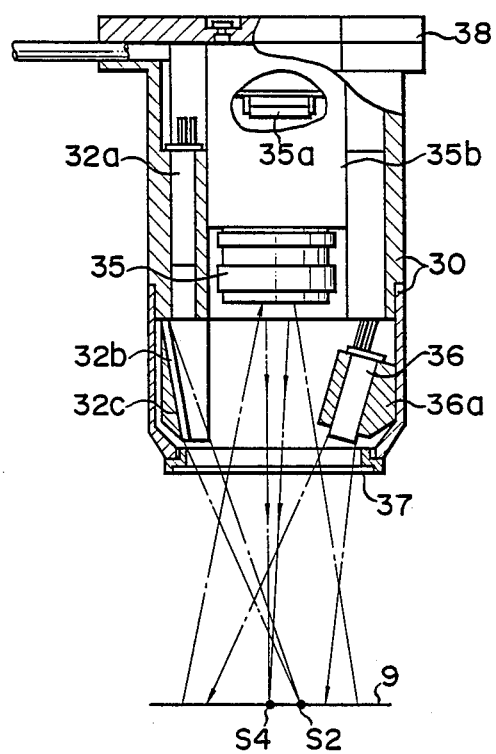

F I G. 5
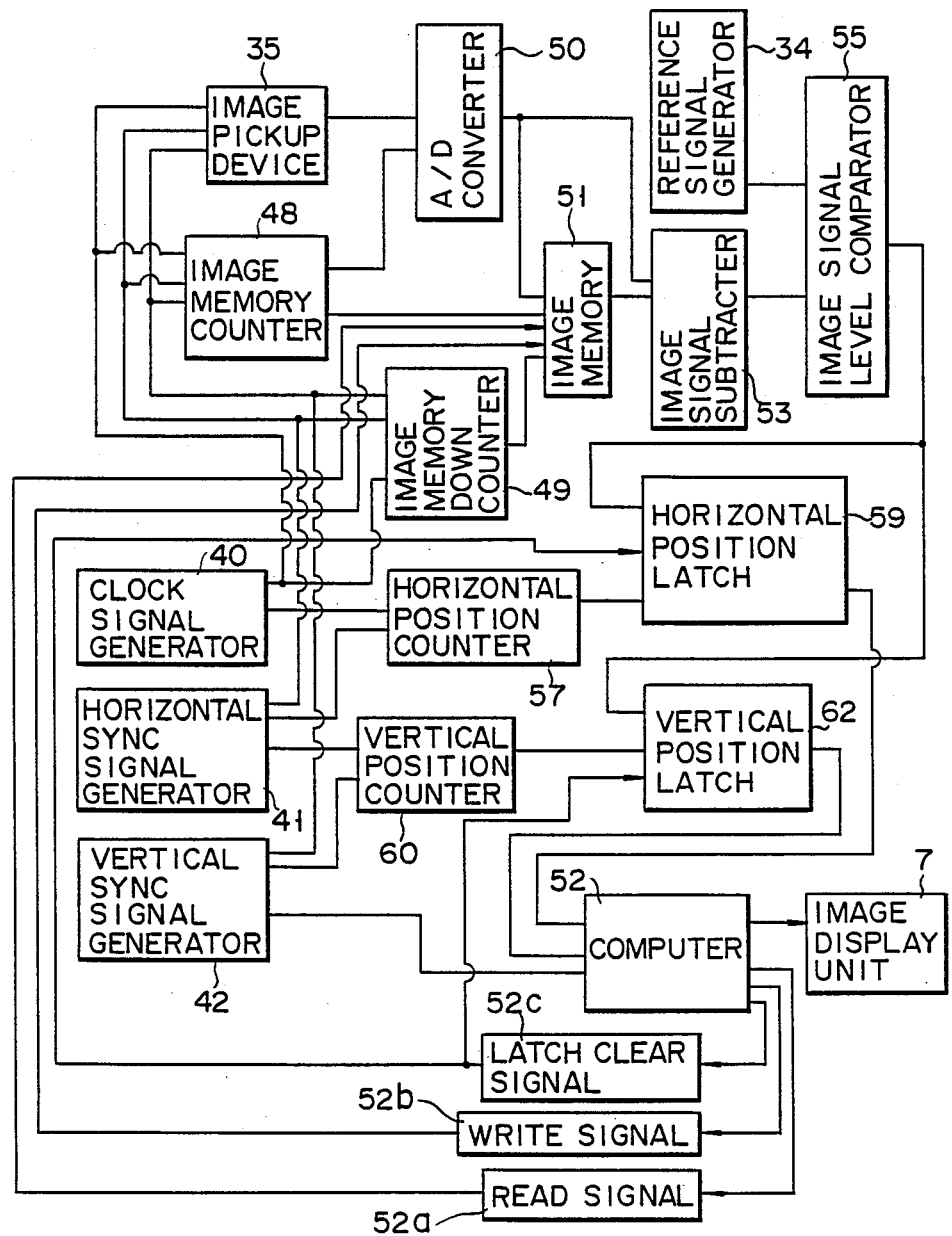

F I G. 10
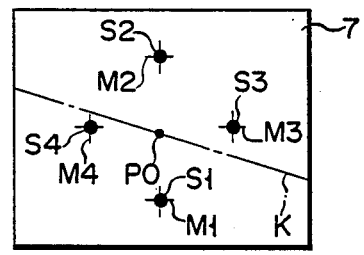
F I G. 11A
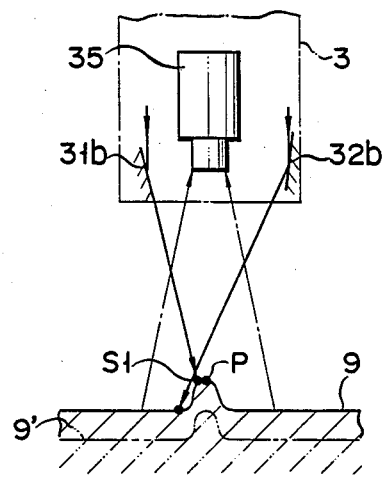
F I G. 11B
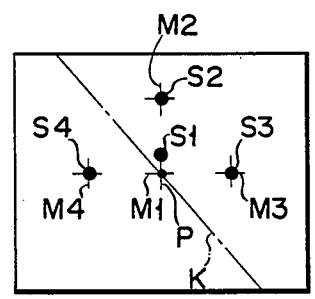

F I G. 12
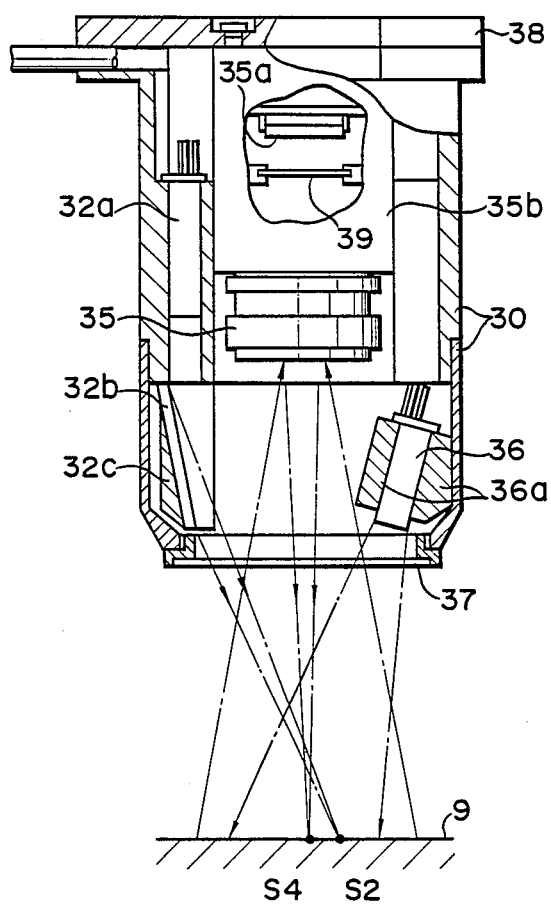

F I G. 16A
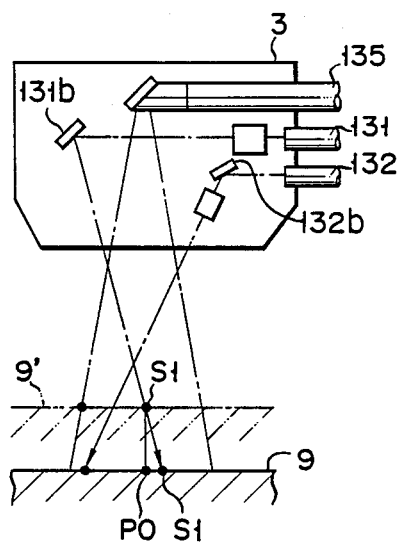
F I G. 16B
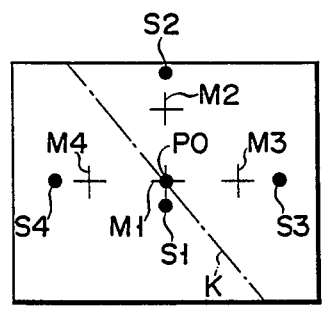

F I G. 29B
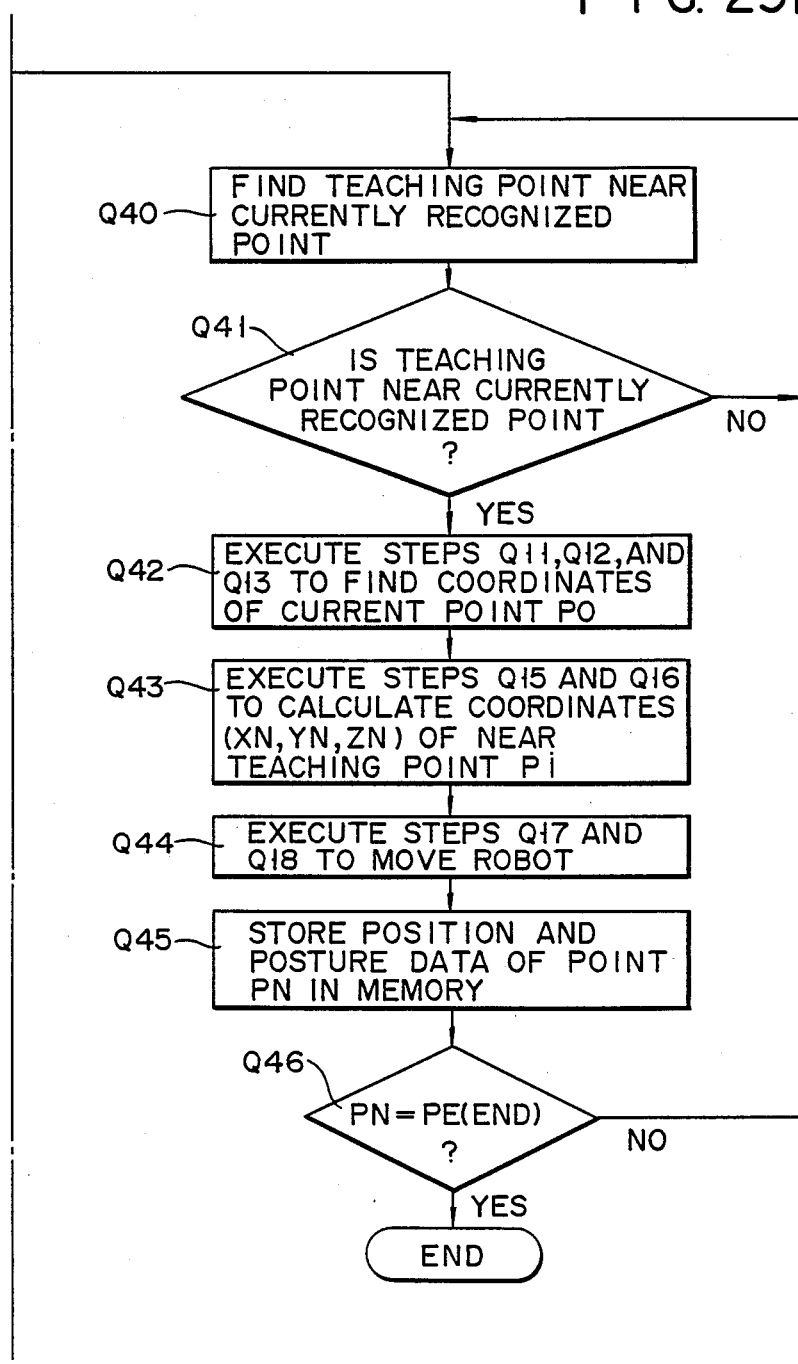

2

THREE-DIMENSIONAL POSITION SENSOR AND THREE-DIMENSIONAL POSITION SETTING SYSTEM

TECHNICAL FIELD

This invention relates to a three-dimensional position sensor which can measure the position and inclination angle of a sensor body with respect to a workpiece, without contacting the workpiece, while an industrial robot or the like is performing three-dimensional tooling and assembly of the workpiece. The invention also relates to a three-dimensional position-setting system which uses said three-dimensional position sensor in order to teach tooling and assembly postures to the robot.

BACKGROUND ART

In industrial robots installed for the product assembly process in manufacturing lines and for cutting and tooling of materials, teaching of a route and an operation sequence of a work head must be performed according to the shape of a three-dimensional workpiece prior to operation in practice. The operation for teaching three-dimensional operation of the work head is so-called "teaching". Teaching has been performed by manual operations in conventional industrial robots. For example, if an operator performs teaching for a $CO_2$ laser cutting robot, he must operate a teaching pendant to cause a work head to come close to each teaching point constituting a scribed line marked on the surface of a workpiece as an object. Therefore, the work head is set in a predetermined three-dimensional position with respect to the teaching point, and three-dimensional position data is stored to complete teaching.

In recent years, for example, a magnetic sensor arranged near a work head is used to improve teaching efficiency. A magnitude of an eddy current generated on the workpiece is detected by the magnetic sensor, and a distance between the work head and the surface of the workpiece is measured. A distance between the work head and the workpiece is set on the basis of the measured distance In conventional teaching operation, the operator must visually check the three-dimensional position of the work head with respect to the teaching point. For this reason, teaching results in cumbersome and time-consuming operations. In addition, skills are undesirably required to perform accurate position setting.

In a conventional position setting system having a conventional sensor such as a magnetic sensor, the distance between the head and the workpiece can be easily set. However, since the magnetic sensor has a large sensing area, measurement precision for a distance between the workpiece and a small area of the head is poor. The posture of the work head for the workpiece must be adjusted relying on visual setting by the operator. In this manner, high teaching efficiency and great improvement in measurement precision cannot be expected.

The present invention has been made in consideration of the above situation, and has as its object to provide a three-dimensional position sensor capable of accurately detecting a position and inclination angles of a sensor body with respect to a workpiece in a noncontact manner. It is another object of the present invention to provide a three-dimensional position setting system using the above three-dimensional sensor to accurately perform teaching for a robot or the like within a short period of time without requiring skills.

DISCLOSURE OF INVENTION

In order to achieve the above objects of the present invention, there is provided a three-dimensional position sensor characterized in that the sensor detects a three-dimensional position and a posture with respect to a position setting point indicated on an object and comprises: a sensor body; projecting means for obliquely emitting light onto the object to form a plurality of bright spots on a surface of the object so as to constitute at least vertices of a triangle; image pickup means for picking up an image including the bright spots formed on the surface of the object by the projecting means, the position setting point indicated on the object, and the surface of the object; and image processing means for electrically reading the bright spots and the position setting point, both of which are picked up by the image pickup means, and for detecting the three-dimensional position and the posture of the sensor body with respect to the position setting point.

The three-dimensional position setting system according to the present invention is characterized in that the system is adapted to detect the three-dimensional position and the posture of the head with respect to the position setting point indicated on the object and to arbitrarily control the head to oppose the position setting point, and comprises:

projecting means, arranged on the head, for obliquely emitting light on an object and forming a plurality of bright spots on a surface of the object so as to constitute at least vertices of a triangle;

image pickup means, arranged on the head, for picking up an image including the bright spots formed on the object by the projecting means, a position setting point indicated on the object, and the surface of the object;

image processing means for electrically reading the bright spots and the position setting point, both of which are picked up by the image pickup means, and for detecting a three-dimensional position and a posture of the head with respect to the position setting point;

memory means for storing data of the three-dimensional position and the posture, both of which are detected by the image processing means, with respect to the position setting point; and driving means for reading out data from the memory means to cause the head to oppose to the position setting point in a predetermined three-dimensional position and a predetermined posture on the basis of the readout data.

BRIEF DESCRIPTION OF THE DRAWINGS

FIGS. 3 and 4 are views showing an arrangement of a teaching head, in which FIG. 3 is a sectional view of the teaching head taken along the line III—III of FIG. 2, and FIG. 4 is a sectional view of the teaching head in FIG. 3 taken along the line IV—IV thereof, FIG. 5 is a block diagram showing an arrangement of an image processor, FIGS. 6A and 6B, FIGS. 7A and 7B, and FIGS. 8A and 8B are views for explaining the operations, in which FIGS. 6A 7A and 8A are respectively sectional views showing the positional relationships between the head and the workpiece, and FIGS. 6B, 7B, and 8B are respectively front views showing display images on an image display unit, FIG. 10 is a front view showing conventional reference position marks and conventional bright spots so as to explain the effect of the present invention, FIGS. 11A and 11B are respectively a sectional view showing the positional relationship between the head and the workpiece and a front view showing a display image on the image display unit, FIG. 12 is a sectional view showing a second embodiment of the present invention, viewed from the same section as in FIG. 4, FIGS. 16A and 16B are respectively a sectional view and a front view for explaining the operation of the third embodiment.

BEST MODE OF CARRYING OUT THE INVENTION

An embodiment of the present invention will be described with reference to the accompanying drawings.

Figure 1:
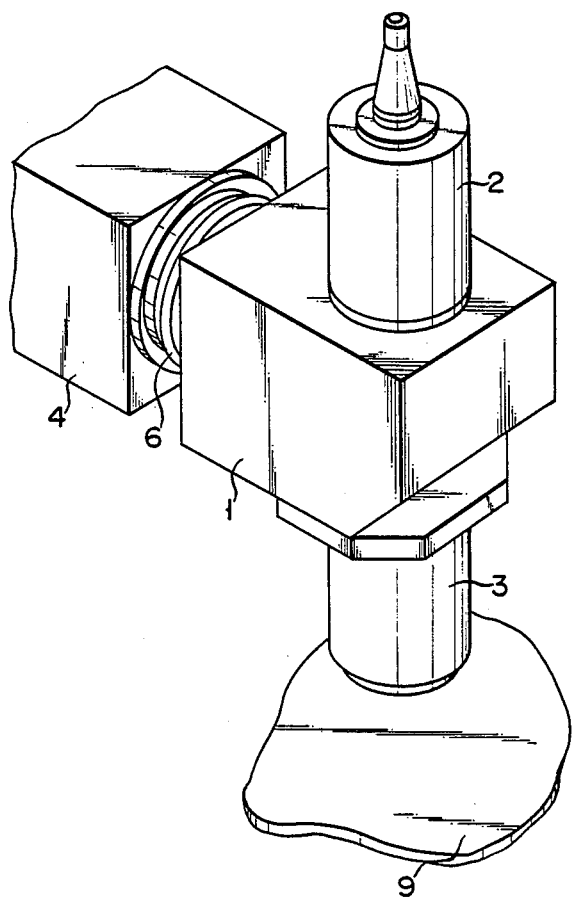
FIG. 1 is a perspective view showing a head portion of a robot to which a three-dimensional position sensor and a three-dimensional position setting system according to the present invention are applied.

FIG. 1 shows a head portion of a cutting robot having a three-dimensional position sensor and a three-dimensional position setting system according to the present invention.

Referring to FIG. 1, reference numeral 1 denotes a head body. Laser work head 2 is mounted on one mounting surface of body 1, and teaching head 3 is mounted on the other mounting surface thereof. Body 1 is pivotally coupled to robot arm 4 through pivot mechanism 6. Upon pivotal movement of body 1 through pivot mechanism 6, teaching head 3 opposes the surface of workpiece 9 as an object during teaching, and laser work head 2 opposes the surface thereof during cutting.

Figure 2:
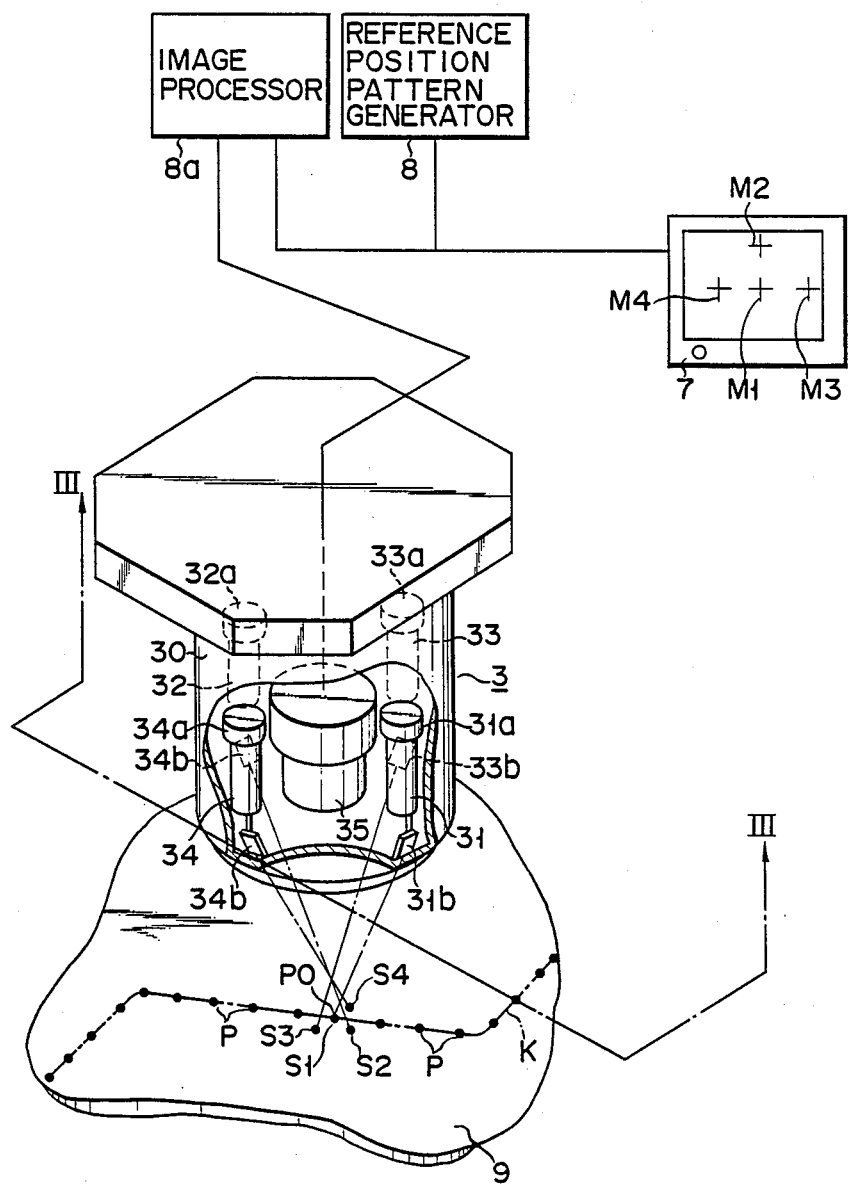
FIG. 2 is a perspective view showing an arrangement of the three-dimensional position sensor.

FIG. 2 schematically shows the overall configuration of a three-dimensional position sensor and a three-dimensional position setting system according to an embodiment of the present invention.

As shown in FIG. 2, the three-dimensional position setting system is mounted on teaching head 3. The three-dimensional position setting system includes image pickup device 35 (to be described in detail later) mounted on head 3, image display unit 7 for displaying an image picked up by device 35, reference position pattern generator 8 for causing display unit 7 to display a reference position pattern, and an image processor 8a for separating a bright spot image signal from an image signal including an image signal of bright spots for setting a distance between workpiece 9 and head 3 and a posture of head 3 with respect to workpiece 9 and an image signal of background light such as illumination. Processor 8a measures the position on the basis of the separated bright spot image signal.

Teaching head 3 comprises head housing 30, four projectors 31 to 34 arranged in housing 30, and illuminators 36 for illuminating the surfaces of image pickup device 35 and workpiece 9. The detailed arrangement of head 3 is best illustrated in FIGS. 3 and 4.

Projectors 31 to 34 respectively comprise semiconductor lasers 31a to 34a and reflecting mirrors 31b to 34b. Lasers 31a to 34a are fixed on the inner wall surface of housing 30 at equal intervals. Head mirrors 31b to 34b are fixed by holders 31c to 34c such that laser beams from lasers 31a to 34a are reflected by workpiece 9. In projectors 31 to 34, the laser beams generated by lasers 31a to 34a are reflected by mirrors 31b to 34b and the reflected beams are emitted onto the surface of workpiece 9, thereby forming bright spots on the surface of workpiece 9. As shown in FIG. 2, projector 31 forms bright spot S1 for setting a distance between the head and the object, and other projectors 32 to 34 form bright spots S2 to S4 for setting the posture of the head with respect to the object.

Image pickup device 35 comprises a solid-state imaging camera using solid-state image pickup element 35a. Device 35 is fixed by camera holder 35b at the center of housing 30. Device 35 picks up spots S1 to S4 formed on the surface of workpiece 9 by projectors 31 and 34 and teaching points along scribed line K indicated on the surface of workpiece 9. A plurality of illuminators 36 for illuminating the surface of workpiece 9 are fixed by holder 36a at the distal end of housing 30.

Reference numeral 37 denotes a dustproof optical filter; and 38, a mounting member for mounting teaching head 3 on head body 1.

Reference position pattern generator 8 generates first reference position mark M1 used to set a distance between workpiece 9 and the head and three second reference position marks M2 to M4 used for setting the posture of the head. Marks M1 to M4 from generator 8 are superposed on the image signal picked up by image pickup device 35 at predetermined positions on the screen of display unit 7, as shown in FIG. 2.

Image processor 8a detects positions of bright spots S1 to S4 on the screen of display unit 7 in response to the image signal from image pickup device 35. The detailed arrangement of processor 8a will be described with reference to FIG. 5.

FIG. 5 is a block diagram of image processor 8a. Referring to FIG. 5, reference numeral 40 denotes a clock signal generator for generating a clock signal as a reference signal for determining the horizontal position of the screen so as to extract an image from image pickup device 35. Reference numeral 41 denotes a horizontal sync signal generator for generating a horizontal sync signal as a reference signal for counting the number of scanning lines on the display screen and for determining a vertical position of the screen. Reference numeral 42 denotes a vertical sync signal generator for generating a vertical sync signal for counting the number of frames. The clock signal, the horizontal sync signal and the vertical sync signal are input to image pickup device 35.

Reference numeral 48 denotes an image memory counter for receiving the clock, horizontal sync, and vertical sync signals. Counter 48 is used to determine a memory address at which a digital image signal is to be stored. Reference numeral 49 denotes an image memory down counter for receiving the clock, horizontal sync, and vertical sync signals. Counter 49 counts the read address signal for reading out data from memory 51 (to be described later).

Reference numeral 50 denotes an A/D converter for receiving the image signal from image pickup device 35 and a corresponding address signal from image memory counter 48. Reference numeral 51 denotes an image memory for storing the digital signal from converter 50 at an address accessed by image memory counter 48 in response to write signal 52b from computer 52 (to be described below). Data is read out from a memory area of image memory 51 at an address accessed by image memory down counter 49 in response to read signal 52a from computer 52. Reference numeral 53 denotes an image signal subtracter for calculating a difference between an output signal from converter 50 and data read out from memory 51. Reference numeral 55 denotes an image signal level comparator for comparing the level of an output signal from subtracter 53 with a reference signal output from reference signal generator 54.

Reference numeral 57 denotes a horizontal position counter for counting clocks of the clock signal from clock signal generator 40 to determine a horizontal position. The horizontal position count of counter 57 is cleared for every scanning line in response to the horizontal sync signal output from generator 41. Reference numeral 60 denotes a vertical position counter for counting a vertical position in response to the vertical sync signal from vertical sync signal generator 42. The vertical position count of counter 60 is cleared for every frame in response to the horizontal sync signal from horizontal sync generator 41. Reference numeral 59 denotes a horizontal position latch for latching an output signal from image signal level comparator 55 in response to the horizontal position signal output from counter 57. Latch 59 is cleared in response to latch clear signal 52c from computer 52. Reference numeral 62 denotes a vertical position latch for latching an output signal from comparator 55 in response to the vertical position signal from counter 62. Latch 62 is cleared in response to signal 52c from computer 52.

Reference numeral 52 denotes a computer for fetching as an image count brightness data corresponding to the horizontal and vertical position signals latched by horizontal and vertical position latches 59 and 62. Computer 52 also receives the vertical sync signal from generator 42. Computer 52 calculates the distance between the head and workpiece 9 and the posture of the head on the basis of bright spot data according to an algorithm to be described later. The calculated results are sent to image display unit 7 or the robot.

Projectors 31 to 34, image pickup device 35, and image processor 8a constitute the three-dimensional position sensor.

The operation of the three-dimensional position sensor having the above arrangement will be described below.

Figure 6A:
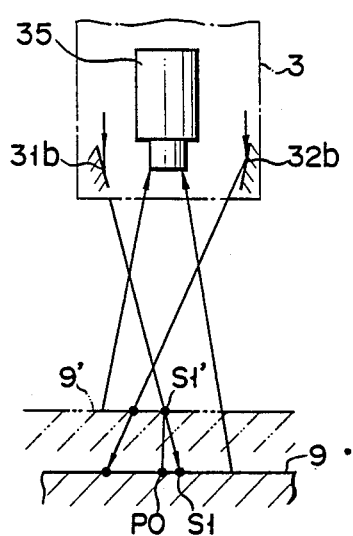

Assume that teaching head 3 is fixed in the state in FIG. 2, and that the position and posture of head 3 with respect to workpiece 9 can be adjusted. In this state, when the laser beams are emitted from semiconductor lasers 31a to 34a, they are reflected by reflecting mirrors 31b to 34b. The reflected beams are obliquely incident on workpiece 9. If the distance between workpiece 9 and head 3 is a predetermined value and the posture of head 3 is proper, the workpiece is represented as workpiece 9', as indicated by the alternate long and short dashed line in FIG. 6A. In this case, the corresponding teaching point is given as teaching point P0. Bright spots S1 to S4 are formed at intersection points between the oblique beams and workpiece 9 when workpiece 9 is located as indicated by the solid line. For this reason, changes in distance and posture with respect to workpiece 9 appear as deviations in bright spots S1 to S4 on display unit 7.

Figure 6B:
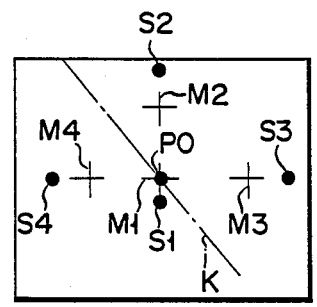
Figure 7A:
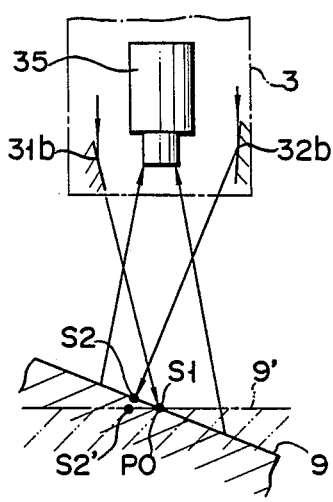
Figure 7B:
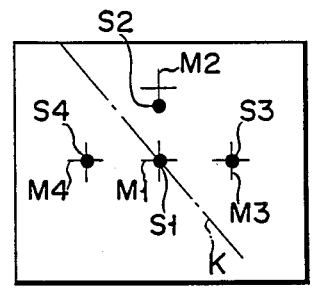
Figure 8A:
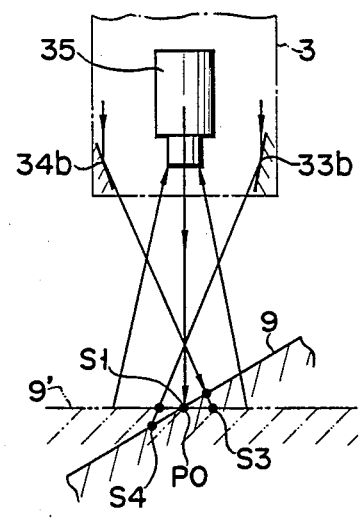
Figure 8B:
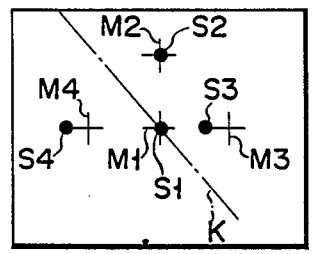

For example, if the distance between head 3 and workpiece 9 is larger than that between head 3 and workpiece 9' located at the reference position, the respective bright spots are located outside reference marks M1 to M4, as shown in FIG. 6B. If workpiece 9 is vertically inclined with respect to workpiece 9' on display unit 7, spot S2 is located inside mark M2, as shown in FIGS. 7A and 7B. If workpiece 9 is inclined in the right-and-left direction of display unit 7 with respect to workpiece 9', spots S3 and S4 are deviated in one direction with respect to marks M3 and M4, as shown in FIGS. 8A and 8B.

Since the bright spots are formed at the intersection points between the oblique beams and workpiece 9, measurement of deviations of bright spots on display unit 7, i.e., calculation of a reference triangle according to similitude allows calculation of coordinates of spots S1 to S4 in the three-dimensional space. The three-dimensional position of spot S1 allows calculation of a distance between head 3 and workpiece 9. The posture of the work can be calculated by spots S1 to S4.

The operation of image processor 8a in FIG. 5 will be described with reference to FIGS. 9A to 9C.

Figure 9A:
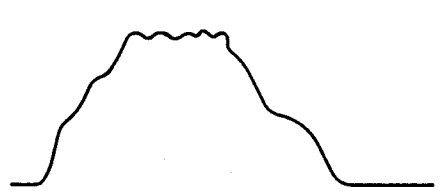
FIGS. 9A to 9C are respectively charts showing waveforms of image signals.
Figure 9B:
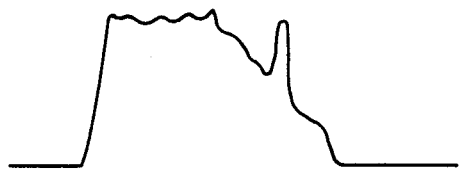
Figure 9C:
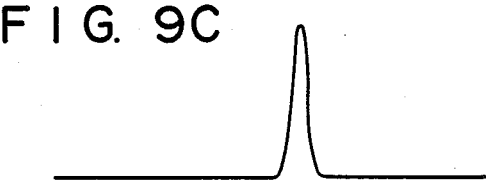

An image without bright spots, i.e., an image of FIG. 9A, is stored in image memory 51. Subsequently, an image with bright spots, i.e., an image of FIG. 9B is stored in memory 51. Image signal subtracter 53 calculates a difference between the images with and without bright spots. Subtracter 53 generates an image representing only the bright spots out of the background light. In other words, an image of FIG. 9C is obtained.

Image signal level comparator 55 can thus compare the bright spot image signal with the reference signal from reference signal generator 54. When the image signal including the background light component, i.e., the image signal representing the image of FIG. 6B, is input to comparator 55, the background light may be erroneously detected as a bright spot. However, the bright spots can be accurately detected by the above-mentioned signal processing.

When image signal level comparator 55 detects the bright spots, a detection signal is sent to horizontal position latch 59 for counting the horizontal positions of the bright spots and vertical position latch 62 for counting the vertical positions of the bright spots. Therefore, the accurate bright spot positions are latched by latches 59 and 62. The bright spot data latched by latches 59 and 62 is fetched by computer 52. The horizontal and vertical position data of the acquired bright spots S1 to S4 are used to calculate the distance between workpiece 9 and head 3 and the posture of head 3 according to similitude with predetermined mathematical expressions. The calculated results are displayed on image display unit 7 through proper signal lines.

The operator visually observes the distance and posture data of workpiece 9 displayed on display unit 7 and differences between reference marks M1 to M4 and bright spots S1 to S4. Therefore, the operator can adjust the position and the posture of the head such that the robot oppose workpiece 9 in an accurate position and an accurate posture with respect to teaching point P0 on workpiece 9.

The case has been described wherein the operator observes the image displayed on image display unit 7 and performs position correction. However, the distance and posture data for workpiece 9 which is calculated by image processor 8a in the three-dimensional position sensor can be transmitted to a robot controller to automatically correct the distance and the posture.

In the above embodiment, the operator visually checks the image displayed on image display unit 7 and reads the distance between workpiece 9 and head 3 and body 3 is then three-dimensionally adjusted such that bright spots S1 to S4 and teaching point P0 coincide with reference marks M1 to M4. Therefore, unlike in the conventional case wherein hunch and skills are of primary importance, teaching can be accurately performed within a short period of time, thereby greatly improving teaching efficiency and precision.

Furthermore, the distance and posture data for workpiece 9 which is calculated by image processor 8a can be transmitted to the robot controller to automatically adjust the three-dimensional position of head body 3, thereby greatly improving teaching efficiency.

Since the influence of background light is eliminated by image signal subtracter 53, image processor 8a can measure the accurate bright spots, thereby preventing teaching errors caused by measurement errors by the operator. In addition, an overrun caused by measurement errors can be prevented when the measured data is sent to the robot controller to perform automatic three-dimensional position control.

The present invention is not limited to the particular embodiment described above. The image processor in FIG. 5 may be operated as follows. The illuminators 36 are kept on/off for a very short period of time (30 ms or less) for which a human eye cannot perceive the ON-/OFF, and the frequencies of clock, horizontal sync, and vertical sync signals synchronized with the image signal are increased to prevent measurement errors caused by illumination light. This embodiment is not based on the technique wherein bright spots in FIG. 10 are formed around teaching point P0, and distance and posture data is measured on the basis of the average values of the bright spots, but on the technique wherein distance setting bright spot S1 and first reference position mark M1 are provided, thereby obtaining the following effect.

Small indentations are present on the surface of workpiece 9. As shown in FIG. 11A, teaching point P is often set on a projection. In this case, if the distance setting bright spot and the reference position mark are not provided and if distance and posture data is calculated from the four bright spots and the reference position marks, as shown in FIG. 10, the bright spots may often be aligned with the reference position marks even if the distance between teaching point P on the projection and the head 3 is not a predetermined distance.

If teaching is performed under this condition, the actual distance between the work head to the teaching point is different from the prescribed value. For this reason, the laser beam is not satisfactorily focused and predetermined cutting cannot be performed. In the worst case, the distal end of the work head is brought into contact with the projection, and the work head may be damaged. However, with the arrangement described above, teaching point P is aligned with reference position mark M1, and this mark M2 is aligned with bright spot S1, thereby setting the distance between the head and the workpiece. Therefore, even if teaching point P is defined on the small projection, as shown in FIG. 11A, the distance can be accurately set for teaching point P on the projection. Erroneous teaching in a wrong positional state can be prevented. Accurate teaching can be performed regardless of the surface state of the workpiece.

As a second embodiment of the present invention, as shown in FIG. 12, semiconductor lasers having an identical wavelength may be used to constitute projectors 31 to 34 and illuminators 36, and optical filter 39 may be arranged in front of solid-state image pickup element 35a. Filter 39 allows emission of output light having only waveform component of projectors 31 to 34 onto element 35a. Even if disturbing light such as sunbeams is present, external light can be attenuated by filter 39 to a lower level. As a result, bright spots by projectors 31 to 34 can be clearly displayed on image display unit 7 without being influenced by disturbing light. This is also applicable to illumination light from illuminator 36. Even if illuminance of light is not limited, the bright spots can be clearly displayed. In this manner, in a state wherein sufficient illuminance control is performed, position control of teaching head 3 can be performed, thereby smoothly performing teaching with good operability.

Figure 13:
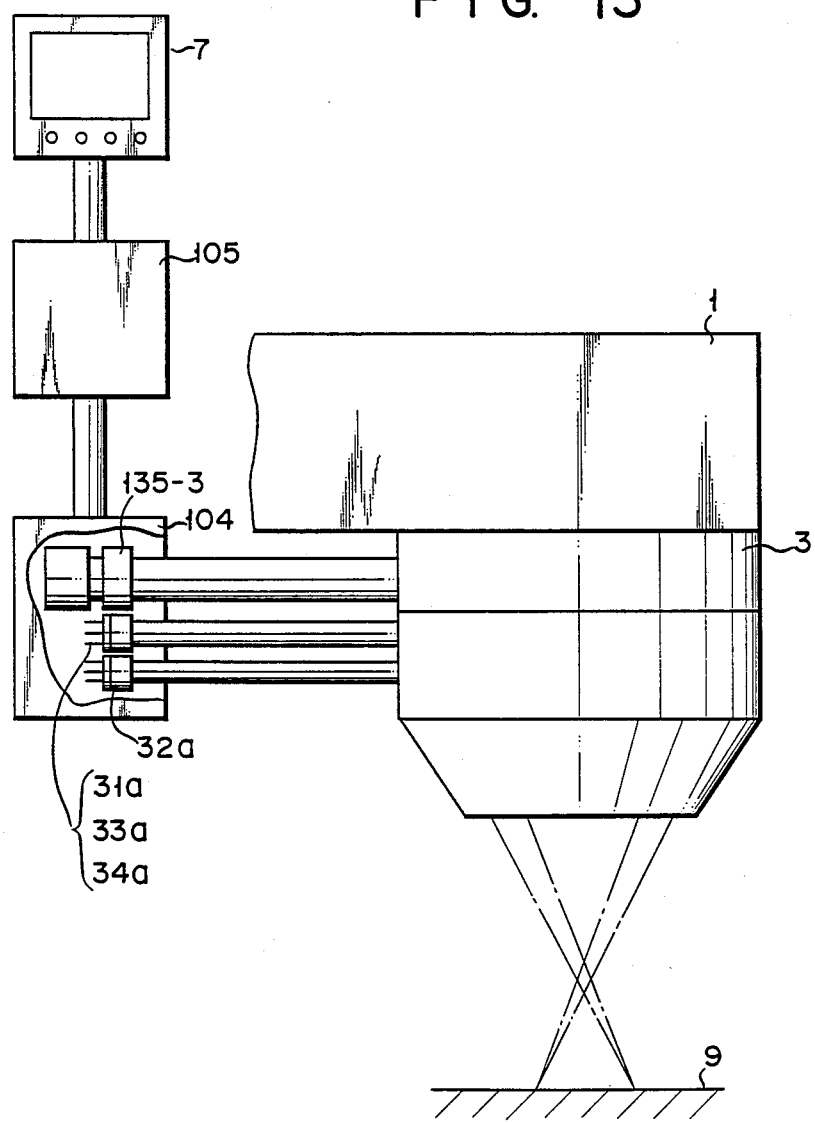
FIG. 13 is a front view showing a three-dimensional position sensor according o a third embodiment of the present invention.
Figure 14:
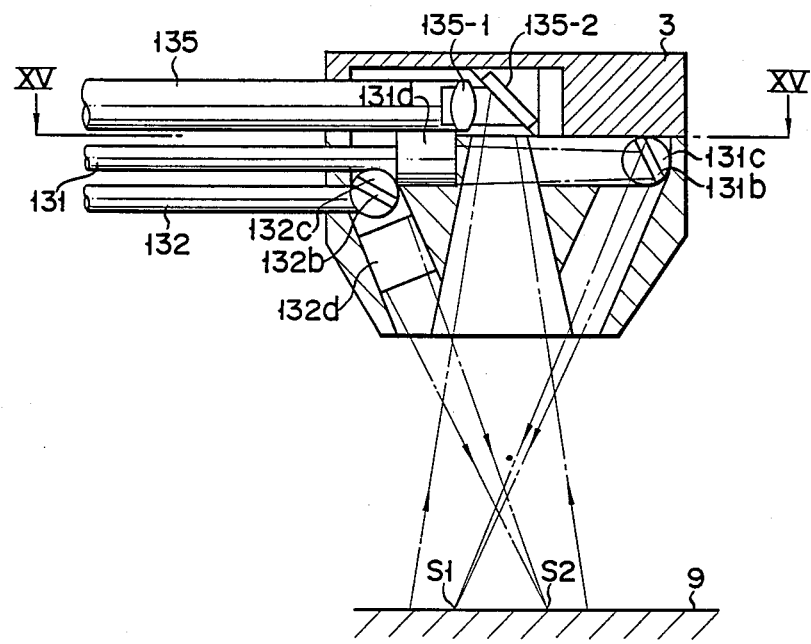
FIG. 14 is a longitudinal sectional view of a teaching head.
Figure 15:
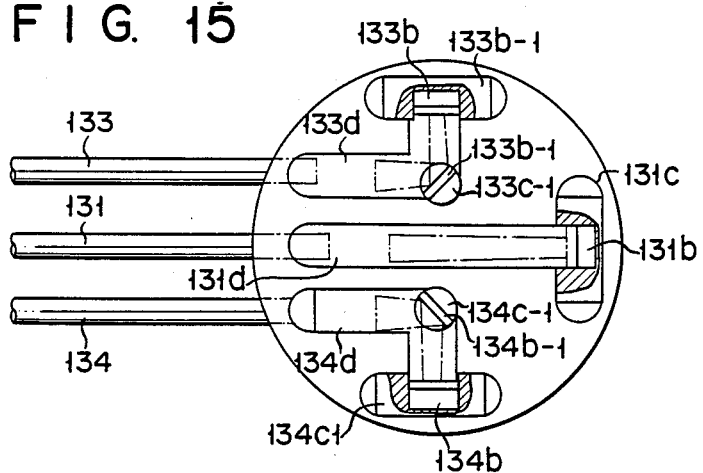
FIG. 15 is a sectional view of the teaching head in FIG. 14 taken along the line XV—XV thereof.

A third embodiment is shown in FIGS. 13 to 16. Teaching head 3 may be constituted by utilizing optical fibers. The same reference numerals as in the first embodiment denote the same parts in the third embodiment, and a detailed description thereof will be omitted. As shown in FIGS. 13 to 15, a three-dimensional position sensor according to the third embodiment comprises teaching head 3, an imaging optical fiber system and a projection optical fiber system, both systems of which are arranged in teaching head 3 and will be described in detail later, sensor driver 104 optically coupled to these systems, sensor controller 105 incorporating image processor 8a for controlling sensor driver 104 and reference position pattern generator 8, and image display unit 7 as a CRT display for displaying the reference position pattern of measured light from sensor controller 105 and an image picked up by teaching head 3.

The internal arrangement of teaching head 3 will be described in detail with reference to FIGS. 14 and 15. FIG. 14 is a longitudinal sectional view of head 3 in FIG. 13, and FIG. 15 is a sectional view of head in FIG. 4 taken along the line II—II thereof. As shown in FIGS. 14 and 15, head 3 includes four projection optical fiber systems 131 to 134 and imaging optical fiber system 132. Fiber system 132 in FIG. 15 is located immediately below system 131 and is not shown therein.

Projection optical fiber systems 131 to 134 comprise reflecting mirrors 131b, 132b, 133b, 133b-1, 134b, and 134b-1, and focusing lenses 131d, 132d, 133d, and 134d, all of which are fixed in grooves or holes formed inside teaching head 3. As shown in FIG. 13, projection optical fiber systems 131 to 134 are optionally coupled to semiconductor lasers 31a to 34a in sensor driver 104, respectively. In this case, reflecting mirrors 131b, 132b, 133b, 133b-1, 134b, and 134b-1 are fixed by holders 131c, 132c, 133c, 133c-1, 134c, and 134c-1, respectively.

In projection optical fiber systems 131 to 134, laser beams generated by semiconductor lasers 31a to 34a are focused by focusing lenses 131d to 134d and reflected by reflecting mirrors 131b, 132b, 133b, 133b-1, 134b, and 134b-1. The reflected laser beams are incident on the surface of workpiece 9 to form bright spots. As shown in FIG. 16, fiber system 131 forms distance setting bright spot S1, and fiber systems 132 to 134 form posture setting bright spots S2 to S4, respectively.

Imaging optical fiber system 135 guides an image of workpiece 9 to image pickup device 135-3 (FIG. 13) through image pickup lens 135-1 and reflecting mirror 135-2, as shown in FIG. 14. Device 135-3 picks up bright spots S1 to S4 formed by fiber systems 131 to 134 and teaching point P on scribed line K, as shown in FIG. 16.

Referring back to FIG. 13, sensor controller 105 generates first reference position mark M1 used for setting a distance between workpiece 9 and the head, and three second reference position marks M2 to M4 used for setting the posture of the head with respect to workpiece 9. As shown in FIG. 13, marks M1 to M4 are superposed on the image signal from image pickup device 135-3 and are displayed at predetermined positions of the display screen of image display unit 7. According to the third embodiment of the present invention, four projection optical fiber systems 131 to 134 are arranged in the teaching head to guide the laser beams from semiconductor lasers 131a to 134a onto the surface of workpiece 9, and fiber system 135 is also arranged in the teaching head to cause device 135-3 to pick up the bright spots and the position setting point formed on workpiece 9. Therefore, the head itself is made compact. As compared with the conventional laser work head, the interference with the workpiece can be reduced to simplify teaching operation.

The arrangement of the third embodiment can be partially modified as follows to obtain the same effect as described above. An illumination optical fiber system may be arranged in parallel with imaging optical fiber system 135 between teaching head 3 and sensor driver 104. Illumination light from the illumination optical fiber system is reflected by reflecting mirror 135-2 to illuminate workpiece 9.

With the illumination optical fiber system, scribed line K and teaching point P on the surface of workpiece 9 can be illuminated bright and clearly displayed on image display unit 7. Therefore, the position of point P can be more accurately detected. In addition, if a semiconductor laser is used in the illumination optical fiber system to illuminate the teaching point or the like, illumination of the teaching point is free from disturbance of the external light, and a clear image can be obtained.

Figure 17:
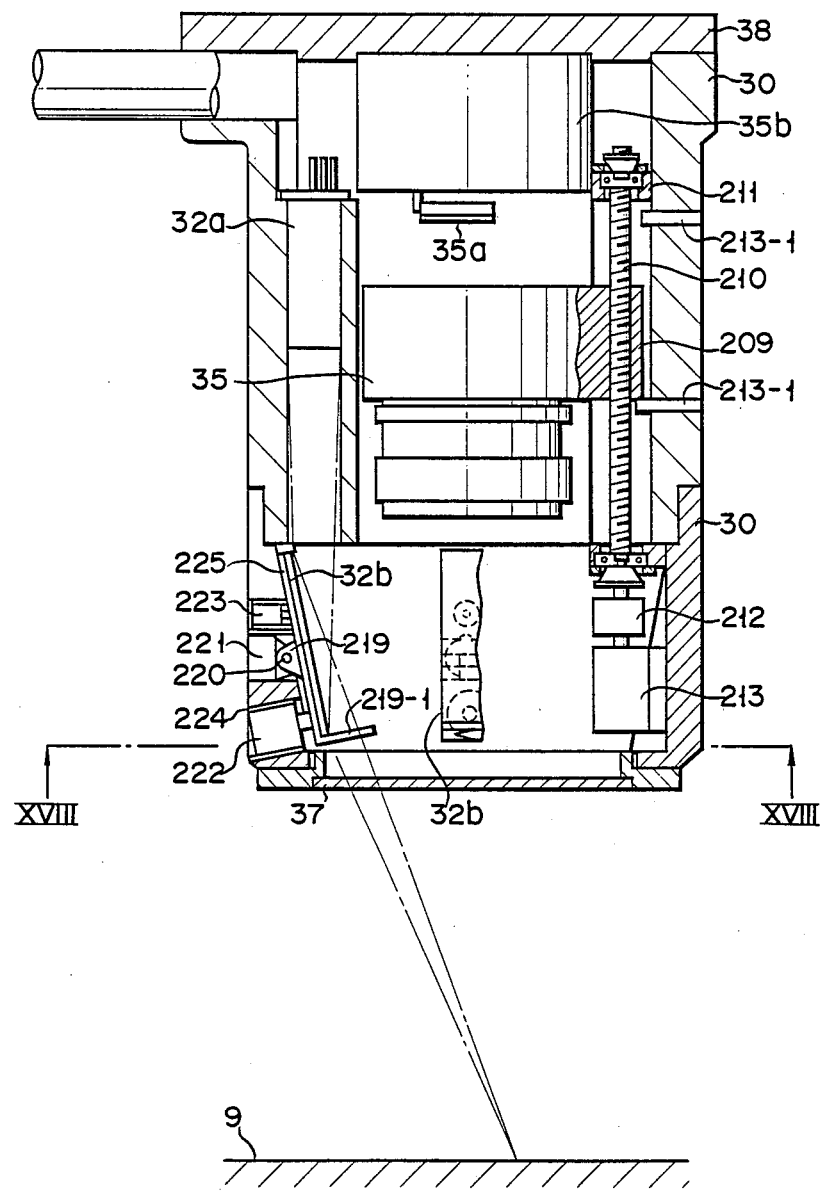
FIG. 17 is a sectional view of a three-dimensional position sensor according to a fourth embodiment of the present invention, viewed from the same section as in FIG. 4.
Figure 18:
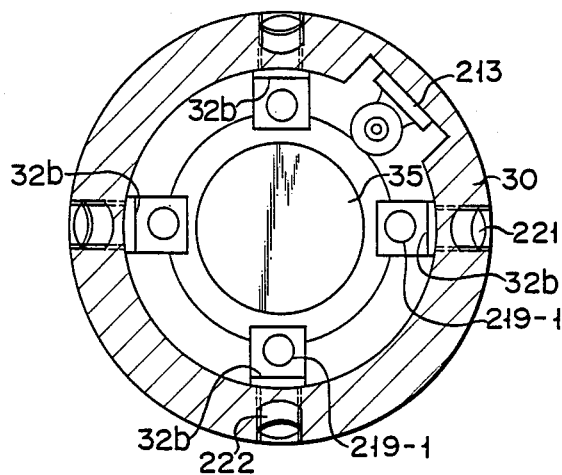
FIG. 18 is a sectional view of the three-dimensional position sensor in FIG. 17 taken along the line XVIII—XVIII thereof.
Figure 19:
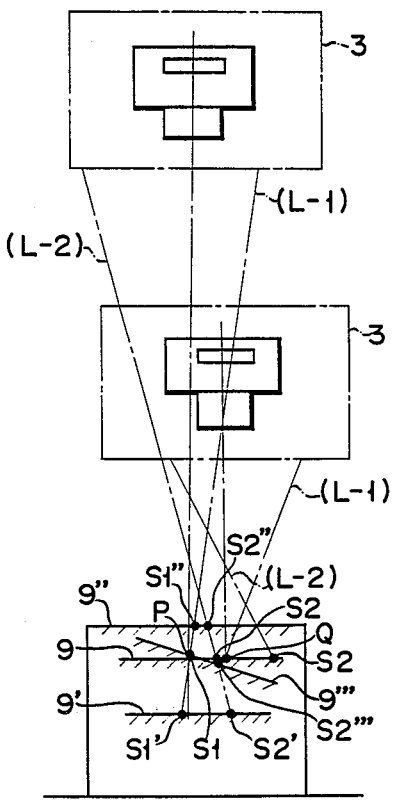
FIGS. 19 and 20 are respectively a sectional view and a front view for explaining the operation of the fourth embodiment.
Figures 20, 21:
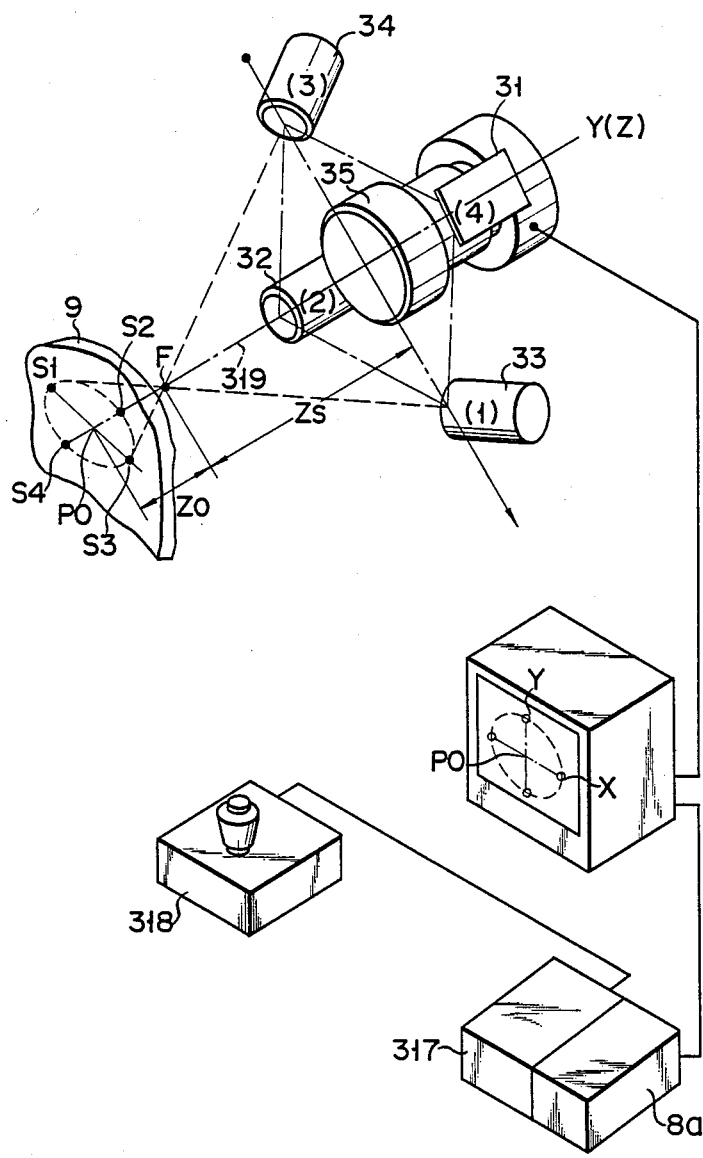
FIG. 21 is a perspective view showing the system configuration of an embodiment of a three-dimensional position setting system according to the present invention.

As shown as a fourth embodiment in FIGS. 17 to 20, a three-dimensional position sensor may comprise an automatic focusing mechanism and an illumination direction switching mechanism of the measuring beam. Referring to FIGS. 17 and 18, teaching head 3 comprises threaded portion 209 for sliding image pickup device 35 back and forth, lead screw 210 which is mounted in threaded portion 209, shaft coupling 211 which is fitted on an end of screw 210 and part of which is fixed to head housing 30, shaft coupling 212 mounted at one end of screw 210, motor 213 one end of which is mounted to coupling 212 and part of which is fixed to housing 30, positioning pin 213-1 mounted on housing 30 to limit a sliding distance of device 35, seesaw mechanisms 219 for holding mirrors 32b such that light is reflected by point P (FIG. 20) on workpiece 9, point P being far away from head 3 along the central axis of image pickup element 35a, or point Q (FIG. 20) on workpiece 9, point Q being near head 3, reflected light stops 219-1 respectively mounted on the distal ends of mechanisms 219, shafts 220 fitted at the pivotal centers of mechanisms 219, solenoids 220 incorporated in housing 30 and each urging one end of corresponding seesaw mechanism 219, springs 223 each mounted at a position opposite the corresponding solenoid along the axial direction of head 3 so as to urge the other end of the corresponding seesaw mechanism, stoppers 224 and 225 for stopping pivotal movement of each seesaw mechanism 219. The operation of the fourth embodiment will be described with reference to FIGS. 17 and 19. As shown in FIG. 19, a distance between teaching head 3 and workpiece 9 is measured in the case of short and long distances. Motor 213 is driven to move image pickup device 35 along the axial direction to perform automatic focusing. The far/near mode is set. Mechanisms 219 are pivoted upon actuation of solenoids 220 to change the reflection angles of laser beams generated by semiconductor lasers 31a to 34a. As an effect of this embodiment, teaching head 3 is located in the far position in FIG. 19 to reduce the reflection angle range of laser beams (L-1), (L-2), . . . , and the focal position of device 35 is set to be far, thereby picking up the entire image of workpiece 9, as shown in FIG. 20. In this manner, coarse teaching is performed. Subsequently, head 3 is located near workpiece 9 to widen the reflecting angle range of laser beams (L-1), (L-2), . . . , and the focal position of device 35 is set near, thereby achieving fine teaching in the same manner as in the previous embodiments.

An embodiment of a three-dimensional position setting system according to the present invention will be described with reference to FIGS. 21 to 24. In the three-dimensional position setting system, a teaching point position picked up and displayed on the image display unit is read by manipulating a joystick or the like, and the read data is automatically matched with the distance data and posture data of the head with respect to workpiece 9, thereby performing automatic teaching.

FIG. 21 shows an arrangement of this embodiment. The three-dimensional position setting system includes joystick 318 for designating any position on image display unit 7 and controller 317 for adding the position designated by joystick 318 and the distance and posture data calculated by image processor 8a, thereby outputting teaching data.

Figure 22A:
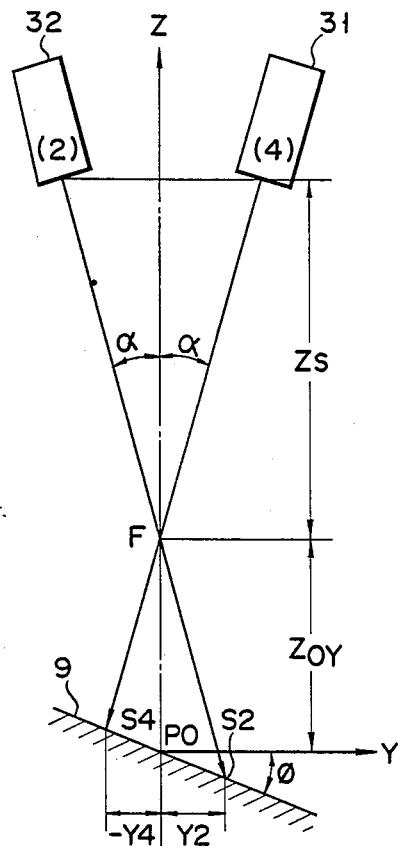
FIGS. 22A, 22B, and 23 are views for explaining the principle of operation of the three-dimensional position setting system.
Figure 22B:
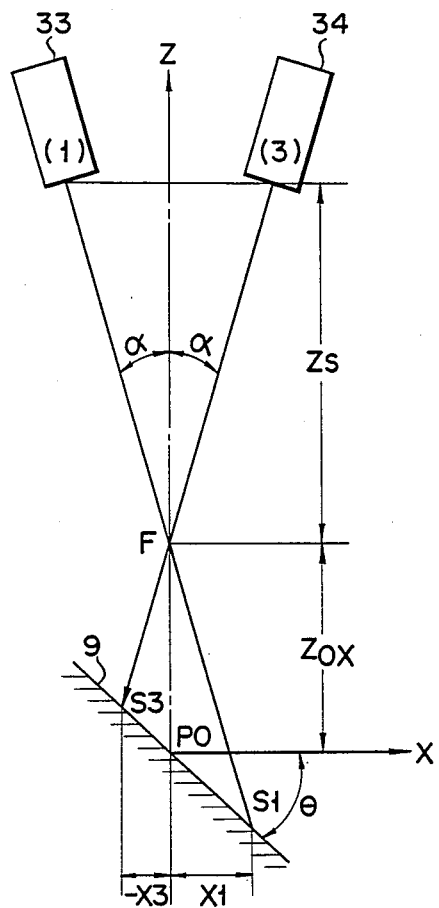
Figure 23:
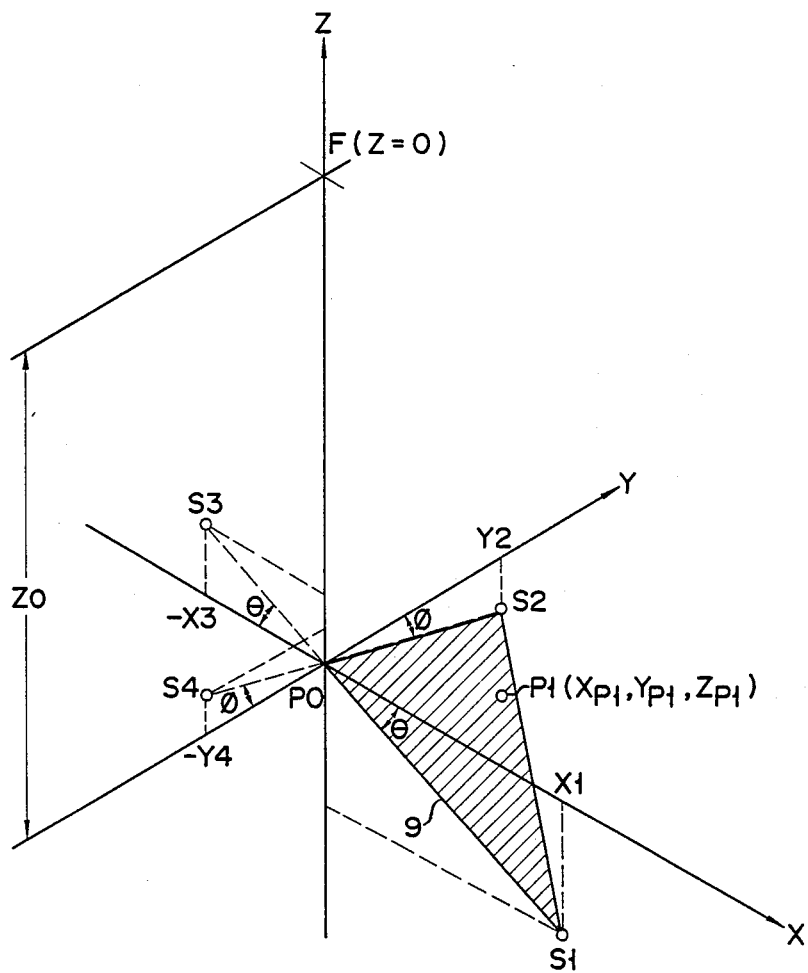

The operation of this embodiment will be described below. A line connecting projectors 33 and 34 in FIG. 21 is defined as an X-axis, and a line connecting projectors 31 and 32 is defined as a Y-axis. A plane including the X- and Y-axes is perpendicular to optical axis 319 of camera 35. Axis 319 is defined as a Z-axis, and the Z-coordinate value of intersection point P0Y (i.e., the reference position) between focal point F along the Z-axis and the surface of the Z-axis workpiece is given as Z0. An angle between the Z-axis and beam spots from projectors 31 to 34 is defined as $\alpha$. Sections of a plane including the Y- and X-axes are shown in FIGS. 22A and 22B. The relationship between the X-, Y-, and Z-axes is shown in FIG. 23.

Referring to FIG. 22A, Y-coordinates at beam spot S2 and S4 are given as Y2 and Y4, respectively. As shown in FIG. 22A, an inclination angle at intersection point P0 on the surface of workpiece 9 along the X-axis is given as $\alpha$. The actual value of Y4 is a negative value. Since the radiation angle $\alpha$ is predetermined, Z-coordinate value Z0Y at point P0 is calculated by equation (1) by simple geometrical considerations utilizing triangular similitude:

$$Z0Y = 2Y2Y4/(Y2-Y4)\tan\alpha \qquad (1)$$

It should be noted that the sign of the Z-axis toward image pickup device 35 is positive.

Similarly, referring to FIG. 22B, X-coordinates of beam spots S1 and S3 are given as X1 and X3 (actually negative), respectively, and an inclination angle at point P0 on workpiece 9 along the Y-axis is given as $\theta$. In this case, Z-coordinate Z0X of point P0 is represented by equation (2) below:

$$Z0X = 2X1X3/(X1-X3)\tan\alpha \qquad (2)$$

Theoretically, Z-coordinate Z0Y coincides with Z-coordinate Z0X. However, these coordinates are measured and do not often coincide with each other. Z-coordinate of point P0 is represented by an average value between the values derived from equations (1) and (2) in the following manner:

$$\begin{aligned} Z0 &= (Z0Y + Z0X)/2 \\ &= [Y2Y4/(Y2-Y4) + \\ &\quad X1X3/(X1-X3)]/\tan\alpha \end{aligned} \qquad (3)$$

Distance Zs between image pickup device 35 and focal point F is predetermined according to a given mechanical structure.

Inclination angles $\phi$ and $\theta$ at point P0 on the surface of workpiece 9 along the X- and Y-axes are geometrically calculated as follows:

$$\phi = -\tan^{-1}[(Y2+Y4)/(Y2-Y4)\tan\alpha] \qquad (4)$$

$$\phi = -\tan^{-1}[(X1+X3)/(X1-X3)\tan\alpha] \qquad (5)$$

It should be noted that inclination angles $\phi$ and $\theta$ toward directions indicated in FIGS. 22A and 22B are negative.

By calculating X-coordinates X1, X2, X3, and X4 of beam spots S1, S2, S3, and S4 displayed on the CRT as image display unit 7, coordinate value Z0 at point P0 on the surface of workpiece 9 along optical axis (Z-axis) 319 and inclination angles $\phi$ and $\theta$ at point P0 on workpiece 9 are calculated.

Figure 24:
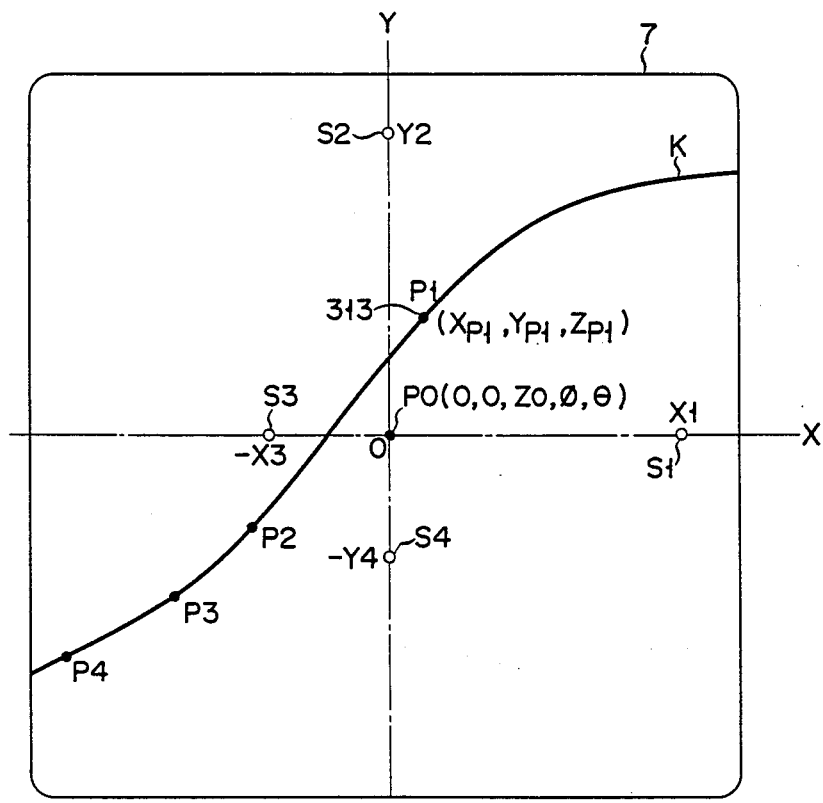
FIG. 24 is a front view showing a display screen of image display unit 7.

As shown in FIG. 24, Z-coordinate value Zp of teaching point 313 (P) (Xp,Yp,Zp) on scribed line K displayed on image display unit 7 is calculated. Point P is designated upon manipulation of joystick 318 connected to controller 317 while the operator observes the image on unit 7. If point P is located near point P0 and angles $\phi$ and $\theta$ are not greatly changed between points P and P0, Z-coordinate value Zp of point P is given as a value obtained by adding a change ($-$Yptan $\theta$, $-$Xptan$\theta$) to Z-coordinate value Z0 of point P0. Since angles $\phi$ and $\theta$ are determined by equations (4) and (5), Z-coordinate value Zp of point P is eventually given by equation (6) below:

$$Zp = (YpY2 + Y2Y4 + Y4Yp)/(Y2-Y4)\tan\alpha + \\ (XpX1 + X1X3 + X3Xp)/(X1-X3)\tan\alpha \qquad (6)$$

Three-dimensional coordinates (Xp,Yp,Zp) of teaching point P are determined by two-dimensional positional relationship (X1,Y2,X3,Y4) of spots S1 to S4 and radiation angle ($\alpha$) of the beams. Movement information can be obtained to move robot work head 2 from a position above point P0 to a position above teaching point P according to coordinates between points P0 and P.

Figure 25:
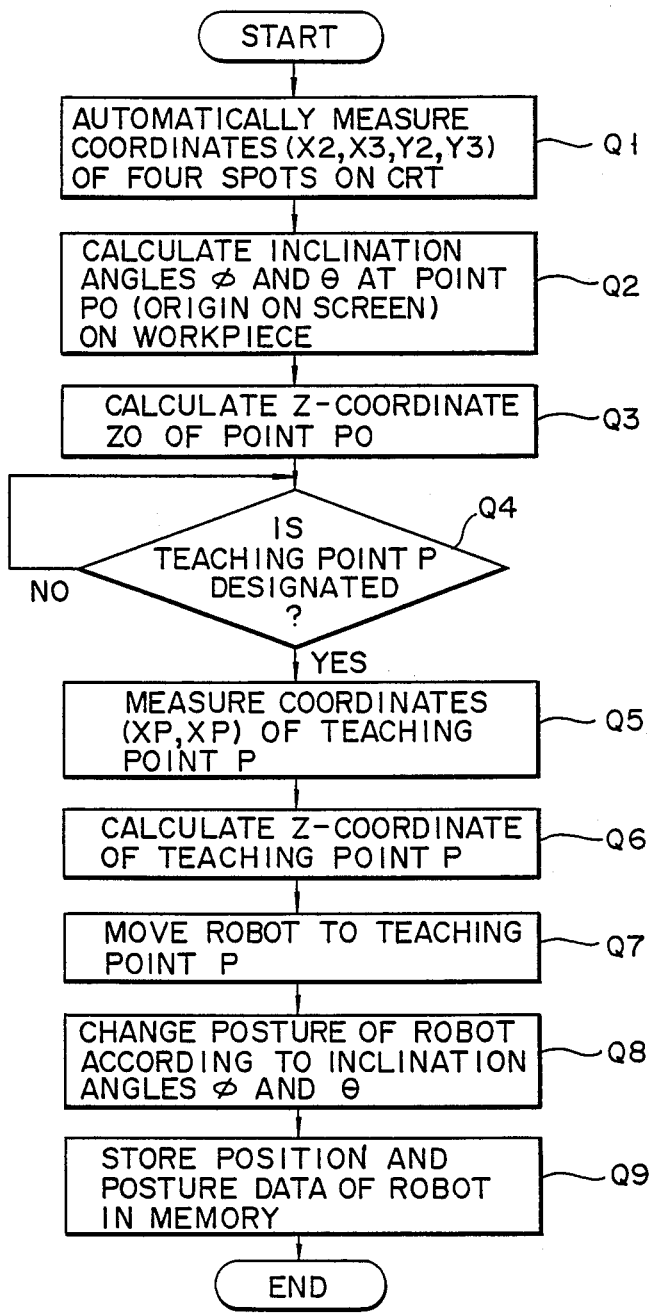
FIG. 25 is a flow chart for explaining teaching processing.

Controller 317 is designed to execute teaching processing for the robot on the basis of the principle of operation described above according to a flow chart in FIG. 25.

When the power switch is turned on and various types of initialization are completed, values of coordinates X1, Y2, X3, and Y4 of four beam spots S1, S2, S3, and S4 displayed on image display unit 7 are read through image discriminator 8a in step Q1. In step Q2, inclination angles $\phi$ and $\theta$ at intersection point P0 between the surface of workpiece 9 and optical axis (Z-axis) 319 are calculated by equations (4) and (5) by using the coordinate values read in step Q2. When calculations of angles $\phi$ and $\theta$ are completed, Z-coordinate Z0 of point P0 is calculated according to equation (3) in step Q3.

When the above processing is completed, the system waits until teaching point P is designated by joystick 318. When point P is designated, coordinate values Xp and Yp of designated point P are read through discriminator 8a in step Q5. When coordinate values Xp and Yp are calculated, Z-coordinate Zp of point P is calculated according to equation (6) in step Q6. When coordinates (Xp,Yp,Zp) of point P are calculated, movement information consisting of a direction and a distance of the robot with respect to teaching head 3 is calculated according to the coordinates between points P0 and P in step Q7. Head 3 is then moved upward above point P according to the movement information. In this case, a distance between focal point F and teaching point P is controlled to coincide with a distance between initial focal point F and point P0. In step Q8, the posture of head 3 is determined according to inclination angles $\phi$ and θ. When posture control is completed, three-dimensional coordinate data and the posture angle data of head 3 are stored in a memory in step Q9. Teaching processing for teaching point P is completed.

In the three-dimensional teaching apparatus of the robot having the arrangement described above, a robot operator turns on a power switch of the teaching apparatus and turns on projectors 31, 32, 33, and 34. The operator then moves teaching head 3 to a position near teaching pont P formed on, e.g., scribed line K. The operator then checks that point P is displayed on image display unit 7. In this case, the operator designates only teaching point P with joystick 318. When point P is designated, head 3 is automatically moved above point P and stops at predetermined posture angles while it is spaced by a predetermined distance apart from point P. Coordinate and posture data of head 3 with respect to point P is stored in the memory.

When the operator designates only point P, automatic teaching is performed, and teaching efficiency can be greatly improved. As a result, utilization efficiency of the robot can be greatly improved.

The position and posture of work head 2 with respect to teaching point P need not be visually set by the operator. Teaching precision can be greatly improved, and work precision of workpiece 9 can also be improved.

In the above embodiment, joystick 318 is used as a means for designating teaching point P. However, any means (e.g., a light pen, a digitizer, or a track ball) for electrically designating any position (coordinates) on image display unit 7 may be used.

Another embodiment of the three-dimensional position setting system having the same arrangement as in FIG. 21 but adopting a method of electrically reading a teaching point position displayed on an image display unit, matching the read data with the distance and posture data of the teaching head with respect to the workpiece, and automatically and continuously tracking teaching point marks will be described below.

Three-dimensional coordinates (Xpl,Ypl,Zpl) of first teaching point P1 are determined by two-dimensional positional relationship (X1,Y2,X3,Y4) and the radiation angle (α) of the beams. Movement information can be obtained to move robot teaching head 3 from a current stop position above intersection point P0 to a position above first teaching point Pp according to the coordinate relationship between points P0 and Pp.

Figure 26A:
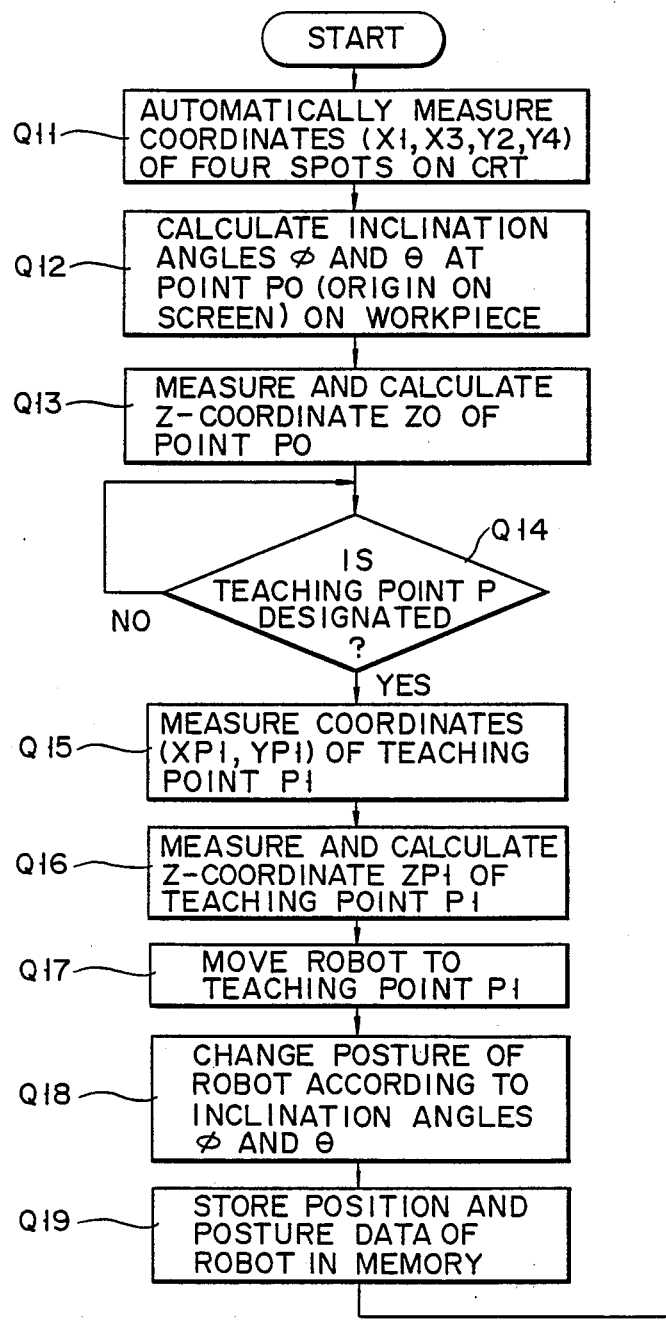
FIG. 26 is a flow chart for explaining teaching processing of another embodiment of the three-dimensional position setting system.
Figure 26B:
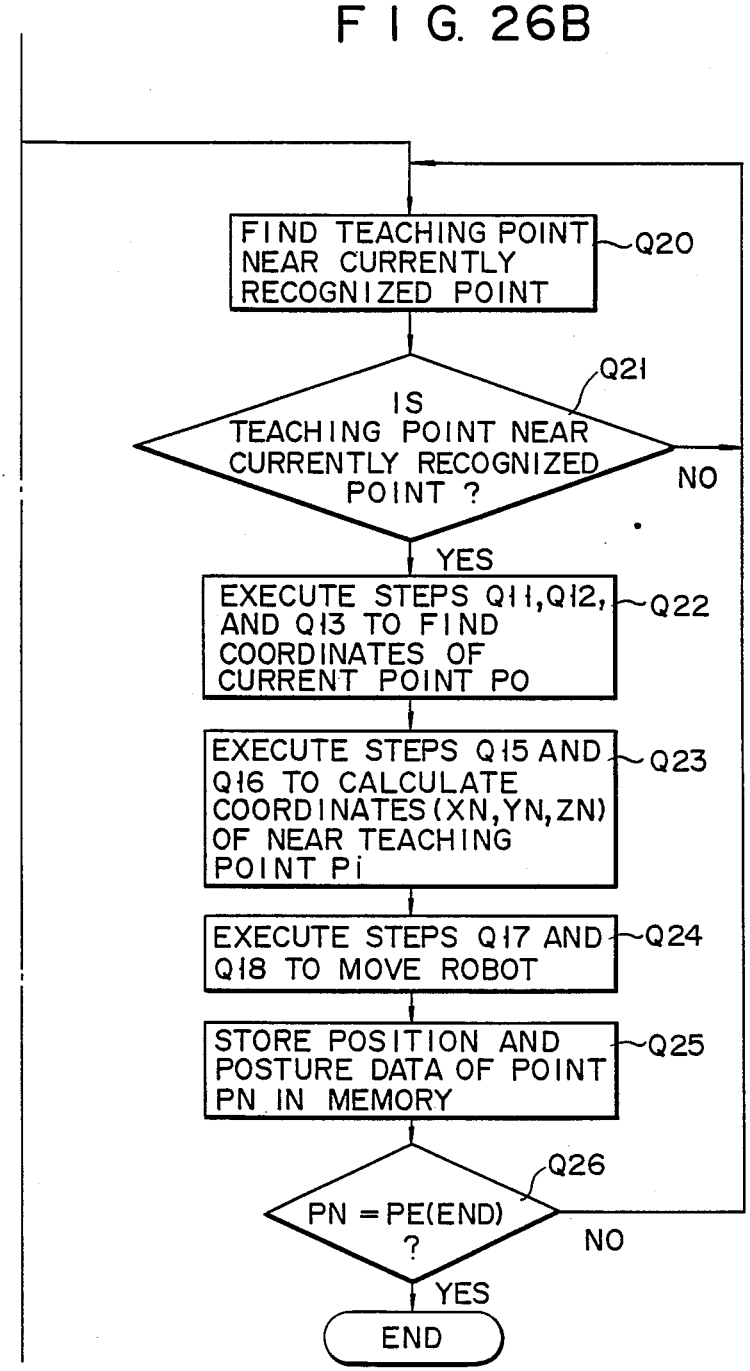

Controller 317 on the basis of the above principle of operation performs teaching processing for the robot according to a flow chart in FIG. 26.

When the power switch is turned on and various types of initialization are completed, values of coordinates X1, Y2, X3, and Y4 of four beam spots S1, S2, S3, and S4 (FIG. 2) displayed on image display unit 7 are read through image discriminator 8a in step Q11. Inclination angles φ and θ at point P0 between the surface of workpiece 9 and optical axis 319 (Z-axis) are calculated according to equations (4) and (5) by using the read coordinate values. When calculations of inclination angles φ and θ are completed, Z-coordinate Z0 of point P0 is calculated by using equation (3) in step 13.

When the above processing is completed, the system waits in step Q14 until first teaching point P1 is designated with joystick 318. When point P1 is designated, coordinates Xpl and Ypl of point P1 designated by joystick 318 are read through discriminator 8a in step Q15. When coordinate values Xpl and Ypl are calculated, Z-coordinate Zpl of teaching point P1 is calculated according to equation (6) in step Q16. When coordinates (Xpl,Ypl,Zpl) of first teaching point P1 are calculated, movement information consisting of the direction and distance of the robot with respect to teaching head 3 is calculated according to the coordinate relationship between intersection point P0 and first teaching point Pp in step Q17. Head 3 is moved to a position above point P1 according to the movement information. In this case, the distance between focal point F and point P1 is controlled to coincide with the distance between first focal point F and point P0.

In step Q18, the posture of teaching head 3 is controlled to a predetermined value according to inclination angles φ and θ. When posture control is completed, the three-dimensional coordinate data and the posture angle data of the work head with respect to first teaching point P1 are stored in the memory in step Q19. In this manner, teaching processing for point Pl is completed.

When teaching processing for first teaching point P1 is completed, another teaching point P near point Pl displayed on image display unit 7 is found in step Q20. In this operation as shown in steps Q21 to Q25, the brightness level of point P1 is discriminated by image discriminator 8a. When teaching head 3 is moved to point P1, point P1 serves as new intersection point P0. Subsequently, discriminator 8a discriminates that a pixel having a level near the brightness level, among the adjacent pixels, is adjacent teaching point PN. Upon movement of head 3 described above, point PN automatically serves as new teaching point Pl.

Teaching processing is performed for new first teaching point P1 and automatically designated teaching point PN. In step Q26, when point PN is updated to last teaching point PE, entire teaching processing is completed.

In a three-dimensional teaching apparatus having the arrangement described above, the robot operator turns on the power switch of the teaching apparatus and turns on projectors 31, 32, 33, and 34. Thereafter, the operator moves teaching head 3 to a position near first teaching point P1 on, e.g., scribed line K. After the operator checks that point P1 is displayed on image display unit 7, he designates point P1 with joystick 318. When point P1 is designated in this manner, head 3 is moved to a position above point P1 and is spaced by a predetermined distance apart from point P1 at predetermined posture angles. Coordinate and posture data of teaching head 3 with respect to point P1 is stored in the memory. Upon completion of data storage, the next bright spot P is automatically designated as the next first teaching point Pl, and head 3 is moved to new first teaching point Pl. In this manner, head 3 is continuously moved to new teaching points PN.

Figure 27:
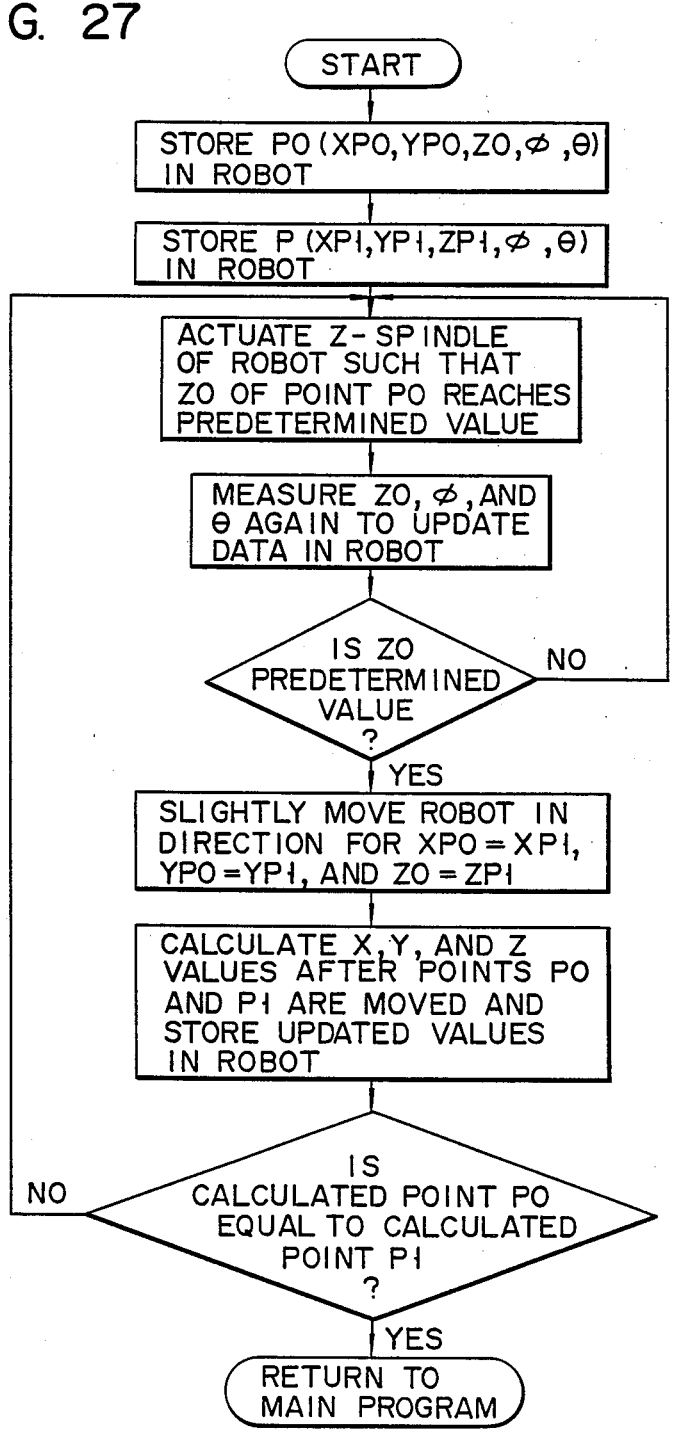
FIG. 27 is a flow chart for explaining a subroutine of step Q17.
Figure 28:
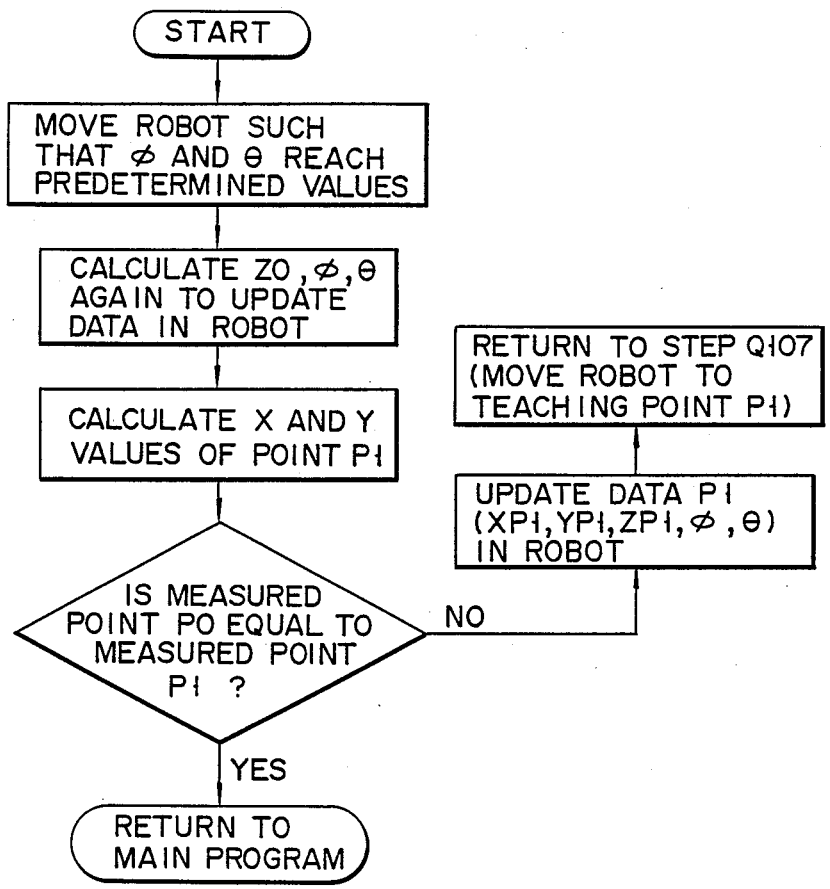
FIG. 28 is a flow chart for explaining a subroutine of step Q18, and FIGS. 29a and 29b disclose a flow chart for explaining teaching processing in an embodiment without using an image display unit.

The contents of steps Q17 and Q18 are respectively shown as subroutines in FIGS. 27 and 28 in detail.

Since the operator simply designates first teaching point P1 to automatically perform teaching, teaching efficiency can be greatly improved. As a result, utilization efficiency of the robot can be greatly improved.

The operator need not visually check the position and posture of teaching head 3 with respect to each teaching point P. Therefore, teaching precision can be improved, and work precision of workpiece 9 is also improved.

Figure 29A:
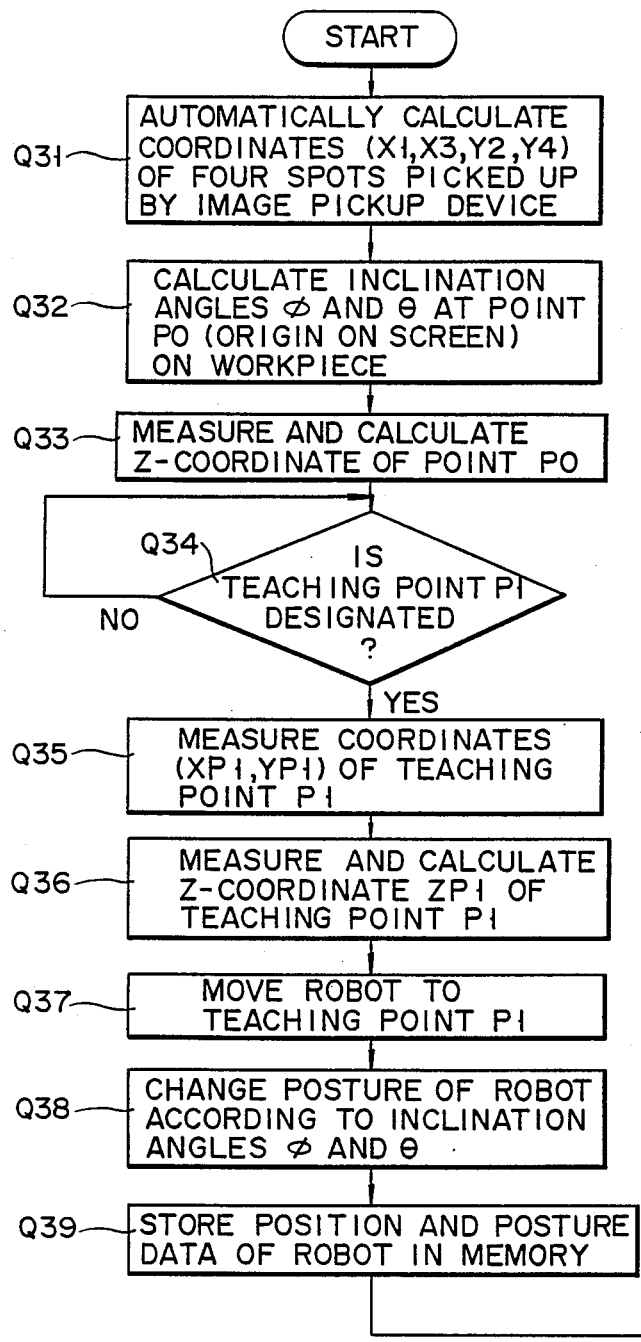

In the operation of FIG. 26, the spot coordinates automatically measured by using spots displayed on the CRT. However, as shown in steps Q31 to Q46 of FIG. 29, spots picked up by the image pickup device may be directly processed to automatically measure their coordinates, thereby obtaining the same effect as in the above embodiment.

Industrial Applicability

According to the present invention, a lot of advantages can be obtained as follows. The distance and posture of the head with respect to an object can be controlled by electrically measuring the measuring bright spots or by detecting a coincidence between the spots and the stationary marks displayed on the image display unit. In addition, a teaching position can be confirmed by detecting a coincidence between any setting point on the object and the stationary marks displayed on the image display unit. The use of the image pickup device as well as the measurements described above may allow the operator to observe the surface state of the object on the image display unit. Furthermore, a position setting point such as a scribed line can be electrically detected by image processing.

We claim:

1. A three-dimensional position sensor for detecting a three-dimensional position and a posture with respect to a position setting point indicated on an object, comprising:

a sensor body;

projecting means having a first projector for projecting a first light beam onto the object so as to form a first bright spot thereon to detect a distance between said sensor body and the position setting point, and a plurality of second projectors mounted on said sensor body for projecting a plurality of second light beams onto the object so as to form a plurality of second bright spots cooperating with the first bright spot to form at least a triangle, said projecting means being arranged to obliquely project the light beams onto the object to form said first and second bright spots on a surface of the object, the plurality of bright spots being formed to constitute at least three vertices of the triangle;

image pickup means for picking up an image including the bright spots formed on the object by said projecting means, the position setting point indicated on the object, and the surface of the object; and image processing means for electrically reading the bright spots and the position setting point which are picked up by said image pickup means and for detecting the three-dimensional position and the posture of said sensor body with respect to the object on the basis of the first and second bright spots wherein said image processing means includes means for detecting the distance between said sensor body and the position setting point through the first bright spot formed on the object upon emission of the exclusive light beam from said first projector; and wherein said projecting means comprises illuminating means for illuminating the surface of the object at a brightness level falling between a brightness level of the first and second bright spots and that of external disturbing light.

2. A sensor according to claim 1, further comprising image display means connected to said image pickup means and having a screen for displaying an image picked up by said image pickup device.

3. A sensor according to claim 2, wherein said image processing means is connected to said image display means and electrically reads out the bright spots and the position setting point which are picked up by said image pickup means from the screen of said image display means.

4. A sensor according to claim 3 wherein said image display means comprises a plurality of reference position marks which serve as targets for positioning the position setting point displayed on the screen and which are displayed stationarily at predetermined positions on the screen such that the reference position marks coincide with said bright spots when a three-dimensional position of said sensor body is set to be a predetermined position with respect to the position setting point on the object.

5. A sensor according to claim 1, wherein said projector comprises supporting means for supporting to be able to change a projection direction, and driving means for changing the projection direction.

6. A sensor according to claim 1, wherein said image processing means subtracts an image signal representing brightness levels of illumination light and the external disturbing light from said illuminating means from an image signal representing brightness levels of the object and each bright spot which are picked up by said image pickup means, extracts only an image signal of bright spots, and electrically detecting positions of the bright spots.

7. A sensor according to claim 1, wherein said image pickup means comprises:

an image pickup body, having a photographing lens, for picking up an image through said photographing lens; and driving means for driving said photographing lens in said image pickup body according to a distance between said image pickup body and the position setting point on the object, thereby achieving focusing.

8. A sensor according to claim 1, wherein said image pickup means comprises:

an image pickup body having a light-receiving surface for receiving light from an image; and an optical filter, mounted on said image pickup body and located in front of said light-receiving surface, for cutting off light having a component excluding a wavelength component of the beam output from said projecting means.

9. A sensor according to claim 1, wherein said projector comprises:

a light-emitting source arranged outside said sensor body;

a light-projecting source arranged inside said sensor body; and an optical fiber system for coupling said light-emitting and light-projecting sources so as to transmit light therethrough.

10. A sensor according to claim 1, wherein said image pickup means comprises:

an image pickup element arranged outside said sensor body;

a photographing lens arranged inside said sensor body; and an optical fiber system for coupling said image pickup element and said photographing lens so as to transmit light therethrough.

11. A sensor according to claim 1, wherein said image pickup means comprises:

a light source arranged outside said sensor body and adapted to adjust an intensity of light emitted therefrom;

an illumination lens arranged inside said sensor body; and an optical fiber system for coupling said light source and said illumination lens so as to transmit light therethrough.

12. A three-dimensional position sensor system for detecting a three-dimensional position and a posture of a sensor body with respect to a position setting joint indicated on an object and for causing said sensor body to arbitrarily oppose the position setting point, comprising:

a sensor body;

projecting means arranged on said sensor body and having a first projector for projecting a first light beam onto the object so as to form a first bright spot thereon to detect a distance between said manner body and the position setting point, and a plurality of second projectors mounted on said sensor body for projecting a plurality of second light beams onto the object so as to form a plurality of second bright spots cooperating with the first bright spot to form at least a vertices of a triangle, said projecting means being arranged to obliquely project the light beams onto the object to form said first and second bright spots on a surface of the object, the plurality of bright spots being formed to constitute at least three vertices of the triangle;

image pickup means for picking up an image including the bright spots formed on the object by said projecting means, the position setting point indicated on the object, and the surface of the object; and image processing means for electrically reading the bright spots and the position setting points which are picked up by said image pickup means and for detecting the three-dimensional position and the posture of said sensor body with respect to the object on the basis of the first and second bright spots;

memory means for storing three-dimensional position data and posture data of said sensor body with respect to the position setting point, the three-dimensional position data and the posture data being detected by said image processing means; and driving means for reading out the three-dimensional position data and the posture data from said memory means and for causing said sensor body to oppose the position setting point in a predetermined posture on the basis of the readout data;

wherein said image processing means includes means for detecting the distance between said sensor body and the position setting point through the first bright spot formed on the object upon emission of the exclusive light beam from said first projector; and wherein said projecting means comprises illuminating means for illuminating the surface of the object at a brightness level falling between a brightness level of the first and second bright spots and that of external disturbing light.

13. A system according to claim 12, further comprising image display means connected to said image pickup means and having a screen for displaying an image picked up by said image pickup means.

14. A system according to claim 13 wherein said image processing means comprises:

reference position calculating means for utilizing a two-dimensional positional relationship between the bright spots displayed on the screen of said image display means and a radiation angle of said projecting means to calculate a distance from said head to the position setting point and inclination angles of said head with respect to the object, the distance and the inclination angles being determined on the basis of the positional relationship between the bright spots on the object;

designating means for designating a teaching point on the screen of said image display means;

automatic measuring means for automatically measuring a two-dimensional positional relationship between the position setting point and the teaching point designated by said designating means; and movement information calculating means for utilizing the positional relationship measured by said automatic measuring means, the distance between said head and the position setting point, and the head inclination angles to calculate movement information for moving said head to the teaching point.

15. A system according to claim 14 wherein said driving means comprises:

moving means for moving said head to the teaching point on the basis of the movement information calculated by said movement information calculating means; and posture control means for controlling the posture of said head moved by said moving means, on the basis of the inclination angles.

16. A system according to claim 13 wherein said image processing means comprises:

reference position calculating means for utilizing a two-dimensional positional relationship between the bright spots displayed on the screen of said image display means and a radiation angle of said projecting means to calculate a distance from said head to the position setting point and inclination angles of said head with respect to the object, the distance and the inclination angles being determined on the basis of the positional relationship between the bright spots on the object;

image discriminating means for discriminating a brightness level of each teaching point displayed on the screen in a plurality of steps;

designating means for designating a first teaching point among the teaching points displayed on the screen;

automatic measuring means for automatically measuring a two-dimensional positional relationship between a reference position and the first teaching point designated by said designating means; and movement information calculating means for utilizing the positional relationship measured by said automatic measuring means and the distance and the inclination angles of said head with respect to the reference position.

17. A system according to claim 16 wherein said driving means comprises:

moving means for moving said head to the first teaching point on the basis of the movement information calculated by said movement information calculating means;

first posture control means for controlling the posture of said head moved by said moving means, on the basis of the inclination angles;

automatic designating means for causing said image discriminating means to find a pixel having a brightness level near that of the first teaching point, among pixels adjacent to the first teaching point, for discriminating a found pixel as an adjacent teaching point, and for continuously replacing the first teaching point with the adjacent teaching point; and second posture control means for continuously moving said head to teaching points sequentially designated by said automatic designating means and for continuously controlling the posture of said head.

18. A system according to claim 12, wherein said head comprises a work head.

* * * * *